(12) United States Patent
Akamatsu et al.

(10) Patent No.: US 7,664,145 B2
(45) Date of Patent: Feb. 16, 2010

(54) JITTER CORRECTING APPARATUS CAPABLE OF ENSURING SYNCHRONISM BETWEEN TRANSMITTER APPARATUS AND RECEIVER APPARATUS

(75) Inventors: Shigeo Akamatsu, Kashihara (JP); Harunobu Mori, Nara (JP); Susumu Kitaguchi, Toyonaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 729 days.

(21) Appl. No.: 10/565,906

(22) PCT Filed: Feb. 3, 2005

(86) PCT No.: PCT/JP2005/001587

§ 371 (c)(1),
(2), (4) Date: Jan. 25, 2006

(87) PCT Pub. No.: WO2005/076513

PCT Pub. Date: Aug. 18, 2005

(65) Prior Publication Data
US 2006/0209769 A1 Sep. 21, 2006

(30) Foreign Application Priority Data
Feb. 5, 2004 (JP) ............................. 2004-029667

(51) Int. Cl.
*H04L 7/06* (2006.01)
(52) U.S. Cl. ....................... 370/516; 375/371; 713/400; 713/503

(58) Field of Classification Search .................. 713/375
See application file for complete search history.

(56) References Cited

U.S. PATENT DOCUMENTS

| 5,966,387 | A | * | 10/1999 | Cloutier | ....................... | 370/516 |
| 6,477,181 | B1 | | 11/2002 | Fujimori et al. | ............. | 370/476 |
| 6,952,456 | B1 | * | 10/2005 | Aiello et al. | ................. | 375/295 |
| 7,031,294 | B2 | * | 4/2006 | Aiello et al. | ................. | 370/348 |
| 7,203,858 | B2 | * | 4/2007 | Loukianov et al. | .......... | 713/400 |
| 2005/0024038 | A1 | * | 2/2005 | Santhoff et al. | ............. | 324/118 |

FOREIGN PATENT DOCUMENTS

| JP | 10-32603 A | 2/1998 |
| JP | 2000-78123 A | 3/2000 |

* cited by examiner

*Primary Examiner*—Chi H. Pham
*Assistant Examiner*—Shick Hom
(74) *Attorney, Agent, or Firm*—Birch, Stewart, Kolasch & Birch, LLP

(57) ABSTRACT

When a beacon (n−1) that is transmitted from a piconet coordinator (PNC) is detected in a MAC layer of the PNC and a MAC layer of a device (DEV), a detection signal is immediately transmitted to a LINK layer. In the LINK layer, a count is made from the detection of the beacon to a predetermined timing to generate a cycle timer. The PNC adds the PNC cycle timer to the subsequent beacon (n) and transmits the beacon to the DEV. In the LINK layer of the DEV, a comparison is made between a DEV cycle timer generated according to the beacon (n−1) and the PNC cycle timer received from the PNC and uses the value of the difference therebetween to correct the DEV cycle timer to be matched with the PNC cycle timer.

9 Claims, 19 Drawing Sheets

OK TO ENTER: /SH/

OK TO ENTER: /SH/

JITTER CORRECTING APPARATUS CAPABLE OF ENSURING SYNCHRONISM BETWEEN TRANSMITTER APPARATUS AND RECEIVER APPARATUS

TECHNICAL FIELD

The present invention relates to a jitter correction apparatus. In particular, the invention relates to a jitter correction apparatus correcting a clock between layers of a transmission apparatus and a reception apparatus so as to reduce jitter in data transmission/reception and capable of ensuring synchronization between the transmission apparatus and the reception apparatus.

BACKGROUND ART

In recent years, there has been a growing interest in UWB (Ultra-Wide-Band) as wireless technology in the ultra-wide-band of several GHz. The UWB wireless technology refers to a communication system that uses, instead of a carrier wave employed in general radio technology, very short pulses of nsec (ten to nine sec) or less.

Regarding the UWB wireless technology using short pulses, the bandwidth corresponds to the wideband of several GHz and thus the UWB wireless technology is called wideband wireless technology. Further, because of the use of the very short pulses, the UWB wireless technology occupies a considerably wide bandwidth, while the frequency spectrum power density is very low. Therefore, as compared with other types of wireless radio technology, the UWB wireless technology is superior in privacy and concealment. In addition, because of no carrier wave, the transmission and reception apparatuses do not require modulation and demodulation circuits, keeping power consumption low. Thus, the UWB wireless technology is superior in some respects as compared with conventional wireless radio technology. Depending on trends in legal regulations in Japan, development of products using the UWB wireless technology is of urgent necessity.

The IEEE (Institute of Electrical and Electronic Engineers) in the US that is the world's greatest standards-setting organization is now studying and establishing proposed standards for use of the UWB wireless technology. Standards have been established under IEEE 802.15.3a for a physical (PHY) layer and IEEE 802.15.3 for a MAC (Medium Access Control) layer.

A description is given in connection with FIG. 17, concerning IEEE 802.15.3 defined as proposed standards for the UWB wireless technology.

As shown in FIG. 17, a network protocol stack is defined by IEEE 802.15.3 with a PHY layer 1001, a MAC layer 1002 and a FCS (Frame Check Sequence) layer 1003 as well as a DEV Device Management Entity (hereinafter referred to as DME) 1004 controlling each layer. PHY layer 1001 and MAC layer 1002 have such control units as a MAC layer management entity (hereinafter referred to as MLME) and a PHY layer management entity (hereinafter referred to as PLME) 1006 for control and management of data transmission/reception in each layer.

More specifically, PHY layer 1001 defines establishment of physical links as well as electrical and mechanical standards and determines an actual data transmission rate and radio frequency band at physical levels. MAC layer 1002 actually determines a communication path between adjacent nodes and transmits/receives data through PHY layer 1001. Basic data transmission/reception can be implemented by these two layers.

FCS layer 1003 is a layer converting data for each application for MAC layer 1002. In general, any portions higher than MAC layer 1002 correspond to applications including FCS layer 1003 and DME 1004. DME 1004 manages control information 1011 to manage and control operations between the layers.

As a method of access between layers, a method of access is defined that is done through an interface point between the layers called SAP (service access point) and that is appropriate for the layers. Between the layers, data and control information are communicated in a manner conforming to the access method.

More specifically, data 1007 sent from an application is transmitted through a FCSL-SAP 1008 that is an interface point between FCS layer 1003 and its higher layer, a MAC-SAP 1009 that is an interface point between FCS layer 1003 and MAC layer 1002 and a PHY-SAP 1010 that is an interface point between MAC layer 1002 and PHY layer 1001.

Further, control information 1011 is communicated between DME 1004 and MLME 1005 of MAC layer 1002 through a MLME-SAP 1012 and between DME 1004 and PLME 1006 of PHY layer 1001 through a PLME-SAP 1013. Control information 1011 is also communicated through MLME 1005 of MAC layer 1002 between DME 1004 and PLME 1006 of PHY layer 1001 through a MLME-PLME-SAP 1014.

IEEE 802.15.3 employs TDMA (Time Division Multiple Access) as a communication system. Over the network as shown in FIG. 18 that is called Piconet established using the UWB wireless technology, data is transmitted/received in accordance with TDMA between a Piconet Coordinator (hereinafter referred to as PNC) that performs centralized management of the network and other devices (hereinafter referred to as DEV). For convenience of the description, FIG. 18 shows piconet 404 including PNC 401 and one device DEV 402.

For communication to be achieved between PNC 401 and DEV 402, PNC 401 sends a beacon frame 403 to each DEV (DEV 402 in the case shown in FIG. 18) belonging to piconet 404 managed by PNC 401. DEV 402 belonging to piconet 404 receives beacon frame 403 from PNC 401 to share time with PNC 401 and accordingly time sharing within piconet 404 is implemented.

The beacon frame is described in connection with FIG. 19. As shown in FIG. 19, PNC 401 that manages piconet 404 conceptually divides a transmission path at constant time intervals into periods T (sec), and successively transmits, at each period T, beacon frame 405 to each DEV (DEV 402 in the case shown in FIG. 18) belonging to piconet 404. The sections at the constant time intervals are each called superframe. A (n−1)-th beacon frame B(n−1) and the n-th beacon frame B(n) are separated to generate a time slot and the time slot corresponding to a predetermined time is used to transmit data between PNC 401 and DEV 402.

The superframe is generated in the MAC layer of the PNC. From an application layer of the PNC, data to be transmitted to the DEV is provided through the MAC-SAP and the MLME-SAP to the MAC layer. In the MAC layer of the PNC, the provided data is structured in the superframe according to the method as defined by the standards of IEEE 802.15.3 and transmitted through the PHY-SAP to the PHY layer. Thus, in order for data to be transmitted from the PNC to the DEV, data and control information are communicated through the MAC-SAP and the NLME-SAP that are interface points between the MAC layer and the application layer.

The UWB wireless technology finds an application, utilizing the high-speed and wideband characteristics, in achieving real-time transmission of AV (Audio Video) data of the HDTV (High Definition Television) class.

Currently, BS digital broadcasting and terrestrial digital broadcasting are standardized by the ISO (International Organization for Standardization)/IEC (International Electrotechnical Commission) 13818-1. Video using a system according to MPEG (Moving Pictures Experts Group)-2 with a transmission rate from several Mbps ($10^6$ bits/second) to several tens of Mbps as well as high-efficiency coding information data of audio are arranged in packets that are sent by multiplexing transmission together with synchronization information and thereby implement digital broadcasting.

FIG. 20 shows a method of establishing synchronization of MPEG2-TS (Transport Stream) that is real-time transmission technology.

With reference to FIG. 20, according to the standards of MPEG2-TS, layers lower than the application layer of the transmission/reception apparatus are synchronized with each other. In order to synchronize the time of respective application layers that include a MPEG2 encoding apparatus 1031 and a MPEG2 decoding apparatus 1032, a program clock reference (hereinafter referred to as PCR) 1033 is used that is information indicating time. Specifically, MPEG2 encoding apparatus 1031 includes a system time clock (hereinafter referred to as STC) 1037 that is a clock of the encoding apparatus and generates PCR 1033 from the transmission time TA of a MPEG2-TS packet 1034 that is obtained from STC 1037. Once in at least 100 msec ($10^{-3}$), PCR 1033 is embedded in MPEG2-TS packet 1034 to be transmitted from MPEG2 encoding apparatus 1031 to MPEG2 decoding apparatus 1032. The PCR that is time information embedded in the MPEG2-TS packet is also called time stamp.

MPEG2 decoding apparatus 1032 also includes a STC 1035 that is a clock of the decoding apparatus. MPEG2 decoding apparatus 1032 compares, with PCR 1033, time TB at which it receives MPEG2-TS packet 1034 in which PCR 1033 obtained from STC 1035 is embedded, controls a phase-locked circuit (Phase-Locked Loop, hereinafter referred to as PLL) 1036 included in MPEG2 decoding apparatus 1032, and matches time TB at which MPEG2-TS packet 1034 is received with time TA at which MPEG2-TS packet 1034 is transmitted.

According to the standards of MPEG2-TS, respective application layers including the encoding apparatus and the decoding apparatus are synchronized in time with each other by the above-described method. Then, for stabilizing the operation of PLL 1036 included in MPEG2 decoding apparatus 1032, it is necessary that MPEG2-TS packets are transmitted to MPEG2 decoding apparatus 1032 so that there is no or minimum occurrence of jitter that is called variation in transmission, namely that time intervals at which the packets are output from MPEG2 encoding apparatus 1031 are kept. If the jitter is large, the time information cannot be matched between the encoding apparatus and the decoding apparatus. As a result, images could distort and, in some cases, the images could not be reproduced. According to the standards of MPEG-2, the tolerable error of the PCR is defined as ±500 nsec.

A description is given in connection with FIG. 21 regarding occurrence of jitter that is variation in transmission.

Referring to FIG. 21, when MPEG2-TS packets (#1, #2, #3 . . . ) are transmitted on a transmission line from the transmitter to the receiver, a certain transmission delay occurs. In an ideal transmission system, when a certain transmission delay time has passed since a MPEG-2 TS packet is transmitted, the packet is received by the receiver and, the time intervals at which the packets are received are kept at time intervals T1, T2, T3 . . . at which the packets are transmitted by the transmitter. In actual transmission, however, except for the case where a transmission path for communication is poor, depending on a difference in operating frequency between the transmitter and the receiver as well as occurrence of processing task, for example, there is generated a difference between an ideal receiving time and an actual receiving time, namely variations 1051 in the intervals at which the packets are received. The variations are called jitter.

Patent Document 1: Japanese Patent Laying-Open No. 2000-78123

DISCLOSURE OF THE INVENTION

Problems to be Solved by the Invention

When the media access control (MAC) defined by IEEE 802.15.3 is applied to MPEG2-TS packets discussed above, the MPEG2-TS packet data is transmitted/received through the MAC-SAP. However, since IEEE 802.15.3 does not specifically define synchronization between layers, if MPEG2-TS packet data is transmitted through the SAP as described above, synchronization between the layers cannot be established and thus packet data could not correctly be transmitted. In particular, when real-time data transmission is to be performed, the timing of transmission/reception between layers is an important factor. Thus, if synchronization between layers cannot be established, there arises a problem that packet data could not accurately be transmitted/received between layers.

Accordingly, the conventional art employs a method for absorbing differences in timing of data communication between layers by using a buffer that uses a data communication system called FIFO (First In First Out). When data is transmitted in real time, however, the amount of data is large and a problem still remains that there is a limit of absorption by the buffer of timing differences.

IEEE 802.11 for example that defines wireless radio shows a method of sharing time information called TSF (Time Stamp Field) between respective MAC layers of a transmission apparatus and a reception apparatus, as a system of establishing synchronization between the transmitter and the receiver. This method is a method according to which reference time information is transmitted from a master to a slave as defined by IEEE 802.11 and the slave uses the reference time information to match the reference time therewith.

Similarly, according to IEEE 802.15.3, such time information as TSF may be added to a beacon to be transmitted by the PNC to allow devices in a network to which the PNC belongs to obtain the common time information. However, the standards of IEEE 802.15.3 do not define a TSF framework. Therefore, TSF information is processed by the application layer at a higher level and the information is communicated through the SAP between the application layer and a layer at a lower level defined by IEEE 802.15.3. In other words, according to the standards of IEEE 802.15.3, information is communicated all the time through the SAP. Therefore, if data is frequently communicated between other devices including the PNC in the network, for example, if data is transmitted in real time, there arises a problem that information queuing occurs between the MAC-SAP or MLME-SAP and the application layer at a higher level, which could be a factor of occurrence of jitter when time information or data is provided to the application at a higher level.

The present invention has been made in view of the foregoing problems. An object of the invention is to provide a jitter correction apparatus that can reduce jitter in data transmission/reception and ensure synchronization between the transmission apparatus and the reception apparatus.

Means for Solving the Problems

With the purpose of achieving the object above, according to an aspect of the present invention, a jitter correction apparatus includes: an output unit generating, in a MAC (Medium Access Control) layer, when data except for a beacon is received in a physical layer, transmission data based on the data received and outputting the transmission data through an interface between the MAC layer and a LINK layer to the LINK layer; a beacon detection signal output unit outputting, when data that is a beacon is received in the physical layer, a beacon detection signal from the MAC layer to the LINK layer; and a correction unit using the beacon detection signal to correct, in the LINK layer, a clock frequency generation function of the LINK layer. The beacon detection signal output unit outputs, from the MAC layer to the LINK layer, the beacon detection signal with higher priority given thereto over the transmission data, without queuing the beacon detection signal together with the transmission data in the interface.

According to another aspect of the present invention, a jitter correction apparatus includes: a reception unit receiving data in synchronization with another apparatus based on a beacon; a definition unit defining transmission and reception of data in the reception unit; and an access control unit outputting the data according to the definition unit. The access control unit includes: an output unit outputting, when data except for a beacon is received by the reception unit, transmission data based on the data through an interface between the definition unit and the access control unit to the access control unit; a beacon detection signal output unit outputting to the access control unit, when data that is a beacon is received by the reception unit, a beacon detection signal with higher priority given thereto over the transmission data, without queuing the beacon detection signal together with the transmission data in the interface; and a correction unit using the beacon detection signal to make a correction to a clock frequency generation function included in the access control unit.

According to still another aspect of the present invention, a jitter correction apparatus includes: a reception unit receiving data in synchronization with another apparatus; a definition unit defining transmission and reception of data in the reception unit; an access control unit outputting the data according to the definition unit; and an output unit outputting a signal used by the reception unit for receiving the data in synchronization with that another apparatus, from the reception unit to the access control unit. The access control unit includes a synchronization unit using the signal to synchronize a clock frequency generation function of the reception unit with a clock frequency generation function of the access control unit.

According to a further aspect of the present invention, a jitter correction apparatus includes: an output unit generating, in a MAC (Medium Access Control) layer, when data except for a signal used for ensuring synchronization of a physical layer is received in the physical layer, transmission data based on the data received and outputting the transmission data through an interface between the MAC layer and a LINK layer to the LINK layer; a detection signal output unit outputting to the LINK layer, indicating that the signal is detected, when the signal is received in the physical layer, a detection signal; and a correction unit using the detection signal to make a correction, in the LINK layer, to a clock frequency generation function of the LINK layer. The detection signal output unit outputs, from the MAC layer to the LINK layer, the detection signal with higher priority given thereto over the transmission data, without queuing the detection signal together with the transmission data in the interface.

Figure 1:
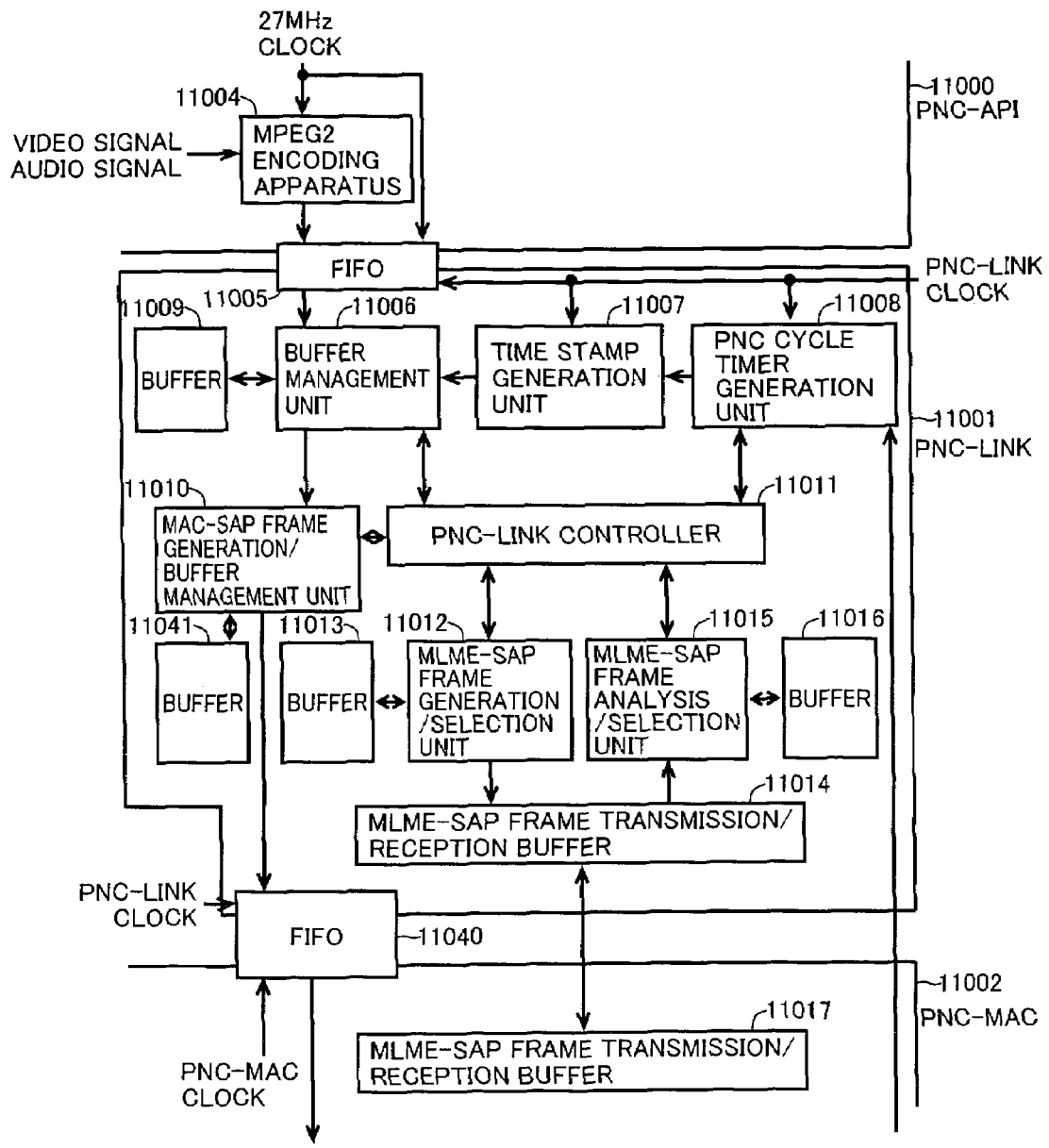
FIG. 1 shows a configuration of a PNC in the present embodiment, particularly a specific example of the configuration from an application layer (PNC-API) to a MAC layer (PNC-MAC).

DESCRIPTION OF THE REFERENCE SIGNS 401 piconet coordinator (PNC), 102 device (DEV), 403, 405 beacon frame, 506 PNC cycle timer generation circuit, 508, 514, 1012 MLME-SAP, 509, 510 beacon, 511 DEV cycle timer generation circuit, 1001 PHY layer, 1002 MAC layer, 1003 FCS layer, 1004 DEV management entity (DME), 1005 MAC layer management entity (MLME), 1006 PHY layer management entity (PLME), 1007 data, 1008 PCSL-SAP, 1009 MAC-SAP, 1010 PHY-SAP, 1011 control information, 1013 PLME-SAP, 1014 MLME-PLME-SAP, 1031, 11004 MPEG2 encoding apparatus, 1032, 13004 MPEG2 decoding apparatus, 1033 program clock reference (PCR), 1034 MPEG2-TS packet, 1035, 1037 system time clock (STC), 1036, 13010 phase clock circuit (PLL), 1051 variation, 11000 PNC-API layer, 11001 PNC-LINK layer, 11002 PNC-MAC layer, 11003 PNC-PHY layer, 11005, 11040, 13005, 13040 FIFO, 11006, 13006 buffer management unit, 11007 time stamp generation unit, 11008 PNC cycle timer generation unit, 11009, 11013, 11016, 11019, 11021, 11041, 13009, 13013, 13016, 13019, 13021, 13041, 110230, 110234 buffer, 11010 MAC-SAP frame generation and buffer management unit, 11011 PNC-LONK controller, 11012, 13012 MLME-SAP frame generation and selection unit, 11014, 11017, 13014, 13017 MLME-SAP frame transmission/reception buffer, 11015, 13015 MLME-SAP frame analysis and selection unit, 11018, 13018 MAC-SAP frame reception buffer management unit, 11020 PHY-SAP frame generation and reception buffer management unit, 11023 PNC-MAC controller, 11024, 13024 MLME-SAP frame analysis unit, 11025, 13025 PLME-SAP frame generation unit, 11026, 13026 PLME-SAP frame transmission/reception buffer, 11027, 13027 PLME-SAP frame analysis unit, 11028, 13028 MLME-SAP frame generation unit, 11029, 13030 PHY frame data reception unit, 11030, 13029 PHY frame data transmission unit, 13000 DEV-API layer, 13001 DEV-LINK layer, 13002 DEV-MAC layer, 13003 DEV-PHY layer, 13050 time synchronization management unit, 13051 DEV cycle timer generation unit, 13052 delay time determination unit, 13053 delay time setting unit, 13010 MPEG2-TS data generation and buffer management unit, 13011 DEV-LINK controller, 13020 MAC-SAP frame generation and reception buffer management unit, 13023 DEV-MAC controller, 110080, 130511 reference timer generation unit, 110081 PNC cycle timer extraction unit, 110231 frame type selection unit, 110232 MAC processing unit, 110233 signal generation unit, 110235 priority addition buffer, 130500 time stamp extraction unit, 130501 output time calculation unit, 130502 packet discard determination unit, 130512 DEV cycle timer extraction unit, 150513 DEV cycle timer temporary storage unit, 150514 cycle timer comparison unit

BEST MODES FOR CARRYING OUT THE INVENTION

Embodiments of the present invention are hereinafter described with reference to the drawings. In the following description, like parts and components are denoted by like reference characters. They also have the same names and functions. Therefore, a detailed description thereof will not be repeated.

Figure 18:
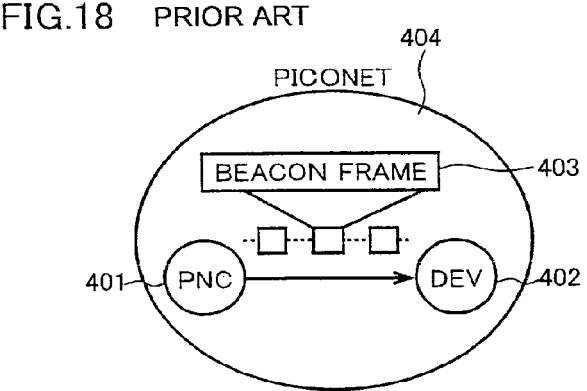
FIG. 18 shows a specific example of a piconet 404 including a PNCPNC 401 and one device DEV 402.
Figure 19:
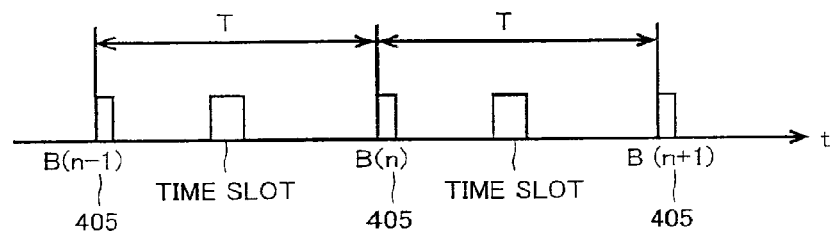
FIG. 19 illustrates a beacon frame.

Regarding the present embodiment, it is supposed that, over a network called piconet that is established using the UWB (Ultra-Wide-Band) wireless technology as shown in FIG. 18, MPEG2-TS (Moving Pictures Experts Group 2-Transport Stream) data is transmitted/received between a PNC (Piconet Coordinator) that performs centralized management of the network and other devices (DEV) in accordance with the TDMA scheme.

Figure 2:
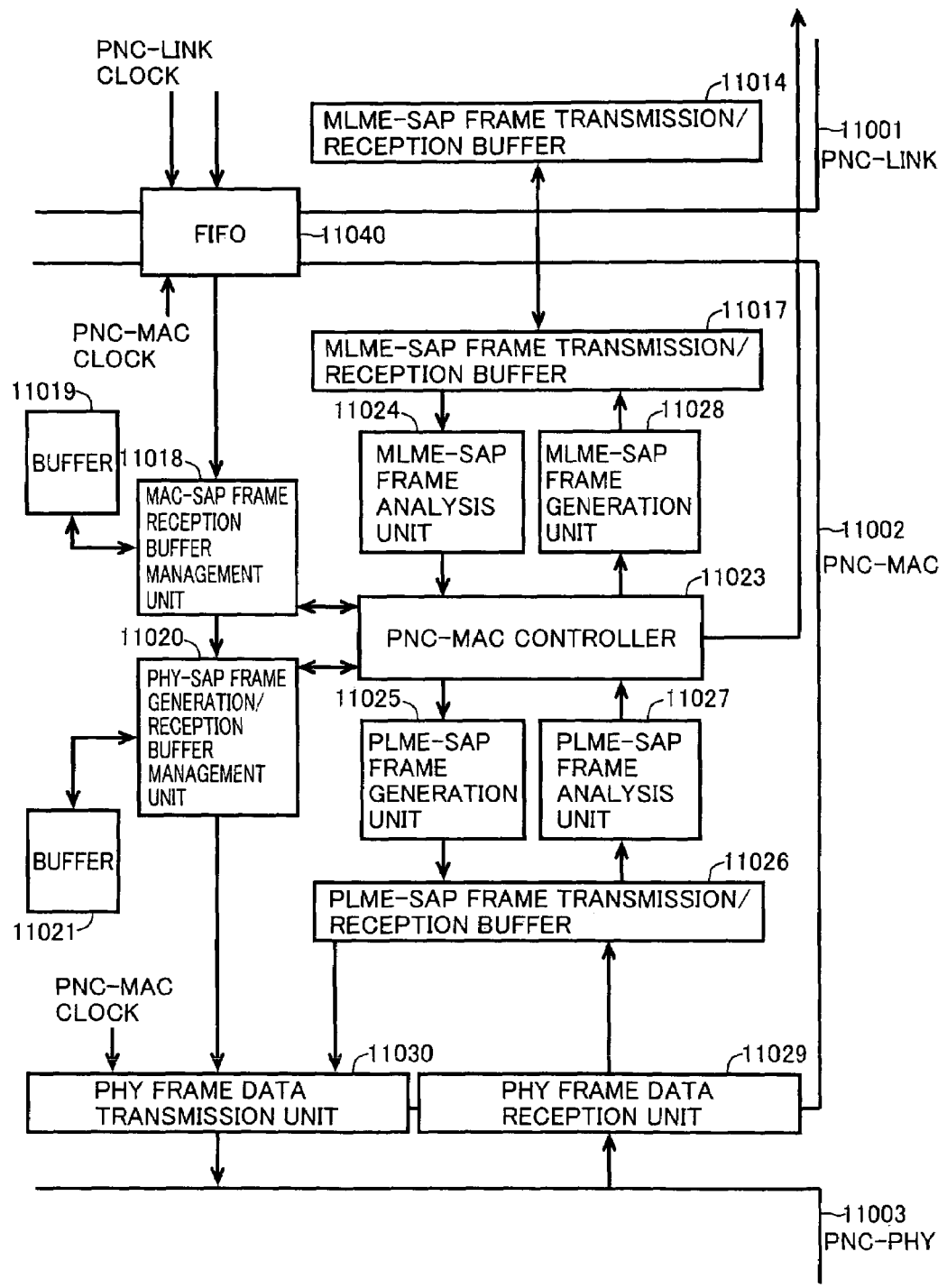
FIG. 2 shows the configuration of the PNC in the present embodiment, particularly a specific example of the configuration from a LINK layer (PNC-LINK) to a physical layer (PNC-PHY).

FIGS. 1 and 2 are used to describe a configuration of the PNC, particularly the configuration from an application layer (PNC-API) to a physical layer (PNC-PHY).

Figure 20:
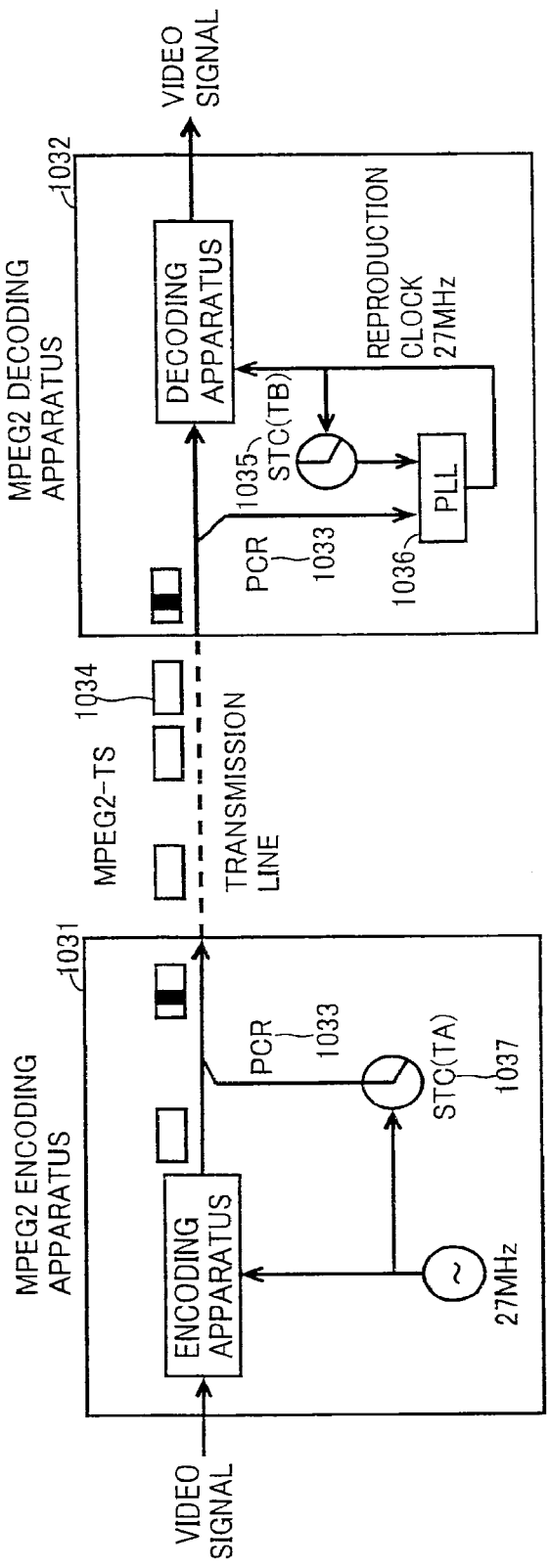
FIG. 20 illustrates how to establish synchronization of MPEG2-TS (Transport Stream) that is real-time transmission technology.
Figure 21:
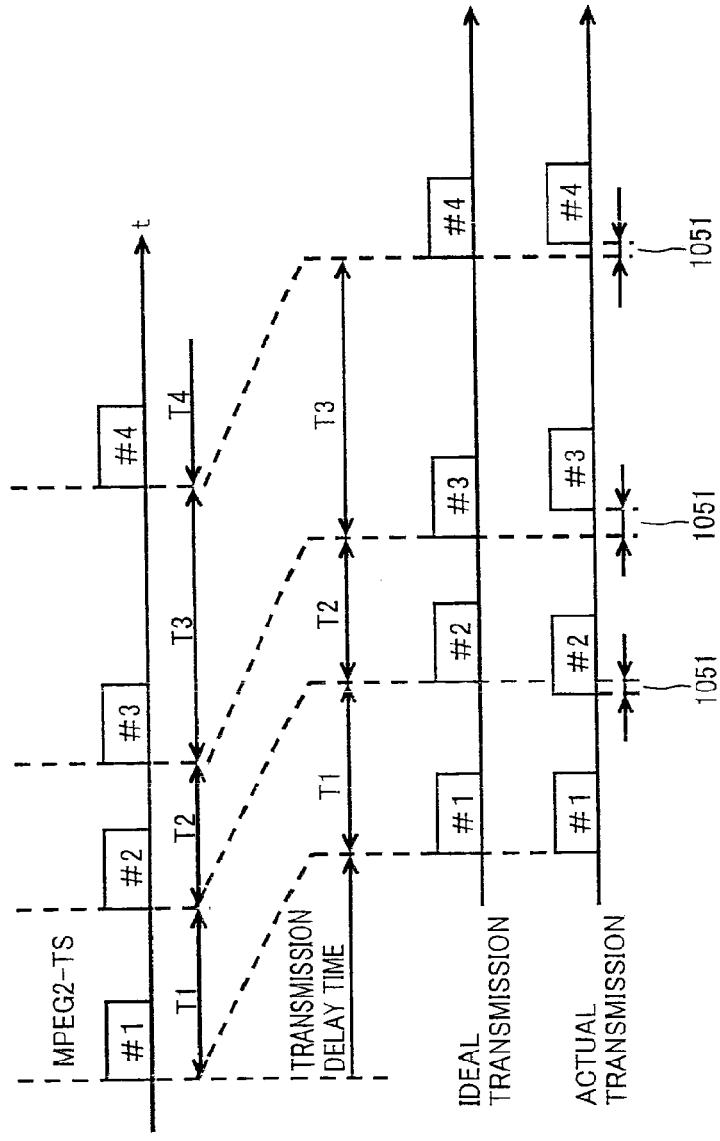
FIG. 21 illustrates occurrence of jitter.

Referring to FIG. 1, PNC-API layer 11000 includes a MPEG2 encoding apparatus 11004 for receiving from an input unit (not shown) a video signal (VIDEO) or audio signal (AUDIO) or both of them and encoding the signals to generate MPEG2-TS data. MPEG2 encoding apparatus 11004 receives a clock frequency signal (hereinafter simply referred to as clock) of 27 MHz that is a standard clock of the MPEG2 system and is generated by a clock generator (not shown), and stores, together with the clock signal of 27 MHz and at a predetermined timing based on the clock, the generated MPEG2-TS data in a buffer 11005 according to the data communication scheme called FIFO (First In First Out) that is for communicating data with a lower layer that is a PNC-LINK layer 11001 (the buffer is hereinafter called simply as FIFO). MPEG2 encoding apparatus 11004 is similar in configuration to the conventional MPEG2 encoding apparatus described above in connection with FIG. 20.

FIFO 11005 is a buffer connecting PNC-API layer 11000 and PNC-LINK layer 11001 and capable of inputting/outputting data in synchronization with the clock. Even if the clock in writing and the one in reading are different, the buffer can change respective clocks to input/output data. FIFO 11005 receives a clock (PNC-LINK clock) of PNC-LINK layer 1001 generated by a clock generator (not shown), reads the MPEG2-TS data stored by MPEG2 encoding apparatus 11004 at a predetermined timing based on the PNC-LINK clock, and provides the read data to a buffer management unit 11006.

PNC-LINK layer 11001 is controlled as a whole by a PNC-LINK controller 11011. PNC-LINK controller 11011 communicates control information with buffer management unit 11006 to control buffer management unit 11006 and obtains, from buffer management unit 11006, such information as overflow of a buffer 11009 that is managed by buffer management unit 11006 and output status of data to a MAC-SAP frame generation and buffer management unit 11010. Further, PNC-LINK controller 11011 also communicates control information with MAC-SAP frame generation and buffer management unit 11010 to control MAC-SAP frame generation and buffer management unit 11010 and obtains, from MAC-SAP frame generation and buffer management unit 11010, such information as overflow of a buffer 11041 managed by MAC-SAP frame generation and buffer management unit 11010, output status of data to a FIFO 11040 and parameters that are written when a MAC-SAP frame is generated as discussed hereinlater. Similarly, PNC-LINK controller 11011 communicates control information with a MLME-SAP frame generation and selection unit 11012 and a MLME-SAP frame analysis and selection unit 11015 to control them.

Buffer management unit 11006 obtains a time stamp from a time stamp generation unit 11007 according to control information from PNC-LINK controller 11011 and adds the time stamp to the MPEG2-TS data that is output from FIFO 11005. The time stamp added here is based on the time at which the MPEG2-TS data is output from FIFO 11005. The generation of the time stamp by time stamp generation unit 11007 is described hereinlater.

Buffer management unit 11006 provides the MPEG2-TS data with the time stamp added thereto to MAC-SAP frame generation and buffer management unit 11010. When the data is provided, buffer 11009 managed by buffer management unit 11006 is used as a temporary buffer.

MAC-SAP frame generation and buffer management unit 11010 is a component for generating a frame (data structure; hereinafter referred to as MAC-SAP frame) conforming to a method of access through a MAC (Medium Access Control)—SAP (Service Access Point) that is an interface point between PNC-LINK layer 11001 and PNC-MAC layer 11002. MAC-SAP frame generation and buffer management unit 11010 generates, according to control information from PNC-LINK controller 11011, a MAC-SAP frame based on the MPEG2-TS data provided from buffer management unit 11006 and writes it, at a predetermined timing based on the PNC-LINK clock, into FIFO 11040 for communicating data with a PNC-MAC layer 11002 that is a layer at a lower level. When the MAC-SAP frame is written, buffer 11041 managed by MAC-SAP frame generation and buffer management unit 11010 is used for adjustments of timing for output to FIFO 11040 and absorbing processing time delay of the MAC-SAP frame generation process.

FIFO 11040 connects PNC-LINK layer 11001 and PNC-MAC layer 11002. FIFO 11040 receives a clock (PNC-MAC clock) of PNC-MAC layer 11002 generated by a clock generator (not shown) and reads the MAC-SAP frame written by MAC-SAP frame generation and buffer management unit 11010 at a predetermined timing based on the PNC-MAC clock.

When control data is to be transmitted from PNC-LINK controller 11011 through PNC-MAC layer 11002, transmission control data is transmitted to MLME-SAP frame generation and selection unit 11012.

MLME-SAP frame generation and selection unit 11012 generates, based on transmission control data provided from PNC-LINK controller 11011, a frame (hereinafter referred to as MLME-SAP frame) conforming to a method of access through the MLME (MAC Layer Management Entity)-SAP that is an interface point of control information between PNC-LINK layer 11001 and PNC-MAC layer 11002. MLME-SAP frame generation and selection unit 11012 temporarily stores the generated MLME-SAP frame in a buffer 11013.

Usually, MLME-SAP frame generation and selection unit 11012 provides MLME-SAP frames stored in buffer 11013 sequentially to a MLME-SAP frame transmission/reception buffer 11014. When priority transmission information that represents priority of transmission is received from PNC-LINK controller 11011, it is determined whether a relevant MLME-SAP frame is given priority to be transmitted according to the priority transmission information. As an example of a MLME-SAP frame to which higher priority is given, there is a MLME-SAP frame according to a beacon information as discussed hereinlater.

The MLME-SAP frame selected by MLME-SAP frame generation and selection unit 11012 is provided to MLME-SAP frame transmission/reception buffer 11014. MLME-SAP frame transmission/reception buffer 11014 communicates the MLME-SAP frame with a MLME-SAP frame transmission/reception buffer 11017 of PNC-MAC layer 11002.

In contrast, when PNC-LINK controller 11011 receives control data through PNC-MAC layer 11002, a MLME-SAP frame that is received from MLME-SAP frame transmission/reception buffer 11017 of PNC-MAC layer 11002 is input from MLME-SAP frame transmission/reception buffer 11014 to MLME-SAP frame analysis and selection unit 11015.

MLME-SAP frame analysis and selection unit 11015 analyzes contents (frame type, data contents, parameters for example) of the MLME-SAP frame input from MLME-SAP frame transmission/reception buffer 11014 and selects a MLME-SAP frame to be provided to PNC-LINK controller 11011. At this time, when an identifier indicating priority that is described hereinlater is added to the frame, for example, when the frame is a MLME-SAP frame according to beacon information with the identifier added thereto, the frame is given priority over other MLME-SAP frames to be provided to PNC-LINK controller 11011.

Referring then to FIG. 2, FIFO 11040 reads a MAC-SAP frame at a predetermined timing based on the PNC-MAC clock and provides the frame to a MAC-SAP frame reception buffer management unit 11018.

PNC-MAC layer 11002 is controlled as a whole by a PNC-MAC controller 11023. PNC-MAC controller 11023 communicates control information with a MAC-SAP frame reception buffer management unit 11018 and a PHY-SAP frame generation and reception buffer management unit 11020 to control them. Further, PNC-MAC controller 11023 receives analysis information from a MLME-SAP frame analysis unit 11024 and a PLME-SAP frame analysis unit 11027, outputs control information to a MLME-SAP frame generation unit 11028 and a PLME-SAP frame generation unit 11025 and controls them.

According to the control information from PNC-MAC controller 11023, MAC-SAP frame reception buffer management unit 11018 temporarily stores the MAC-SAP frame that is output from FIFO 11040 in a buffer 11019.

Buffer 11019 is a buffer managed by MAC-SAP frame reception buffer management unit 11018 and used, for generating a PHY-SAP frame described hereinlater by PHY-SAP frame generation and reception buffer management unit 11020, to wait for transmission when the MAC-SAP frame is to be transmitted from MAC-SAP frame reception buffer management unit 11018 to PHY-SAP frame generation and reception buffer management unit 11020.

MAC-SAP frame reception buffer management unit 11018 manages, according to the control information from PNC-MAC controller 11023, overflow of buffer 11019 that it manages as well as timing of output of the MAC-SAP frame to PHY-SAP frame generation and reception buffer management unit 11020 and sends the control information to PNC-MAC controller 11023.

PHY-SAP frame generation and reception buffer management unit 11020 is a component that generates a frame (hereinafter referred to as PHY-SAP frame) conforming to a method of access through the PHY-SAP that is an interface point between PNC-MAC layer 11002 and PNC-PHY (physical) layer 11003. According to the control information from PNC-MAC controller 11023, PHY-SAP frame generation and reception buffer management unit 11020 generates a PHY-SAP frame based on a MAC-SAP frame provided from MAC-SAP frame reception buffer management unit 11018, and writes the frame, at a predetermined timing based on the PNC-MAC clock, into a PHY frame data transmission unit 11030 for transmitting the data to PNC-PHY layer 11003 that is a layer at a lower level. When the PHY-SAP frame is written, a buffer 11021 that is managed by PHY-SAP frame generation and reception buffer management unit 11020 is used for adjustments of timing at which the generated PHY-SAP frame is output to PHY frame data transmission unit 11030 and for absorbing processing time delay of the PHY- SAP frame generation process. Further, PHY-SAP frame generation and reception buffer management unit 11020 manages overflow of buffer 11021 that it manages and the timing at which the PHY-SAP frame is output to PHY frame data transmission unit 11030 and sends the control information to PNC-MAC controller 11023.

PHY frame data transmission unit 11030 reads, at a predetermined timing based on the PNC-MAC clock, the PHY-SAP frame data written by PHY-SAP frame generation and reception buffer management unit 11020 and transmits the frame data to PNC-PHY layer 11003 that is a layer at a lower level.

In this way, the MPEG2-TS data encoded by the MPEG2 encoding apparatus of PNC-API layer 11000 is successively transmitted through SAPs to PNC-PHY layer 11003, with the time stamp added thereto that is based on the PNC cycle timer generated by PNC cycle timer generation unit 11008 in PNC-LINK layer 11001, and transmitted to the DEV.

A MLME-SAP frame that is communicated with MLME-SAP frame transmission/reception buffer 11014 of PNC-LINK layer 11001 is temporarily stored in MLME-SAP frame transmission/reception buffer 11017 of PNC-MAC layer 11002.

The MLME-SAP frame that is received from MLME-SAP frame transmission/reception buffer 11014 of PNC-LINK layer 11001 is provided from MLME-SAP frame transmission/reception buffer 11017 of PNC-MAC layer 11002 to MLME-SAP frame analysis unit 11024 where control information (data and parameters for example) in the MLME-SAP frame is analyzed. The analysis control data is then provided to PNC-MAC controller 11023.

Based on contents of the analysis control data included in the MLME-SAP frame provided from MLME-SAP frame analysis unit 11024, PNC-MAC controller 11023 transmits, to PLME-SAP frame generation unit 11025, information for generating a frame (hereinafter referred to as PLME-SAP frame) conforming to a method of access through the PLME (PHY layer management Entity)-SAP that is an interface point of control information between PNC-MAC layer 11002 and PNC-PHY layer 11003. PLME-SAP frame generation unit 11025 generates a PLME-SAP frame based on the information about the generation that is input from PNC-MAC controller 11023 and provides the generated frame to PLME-SAP frame transmission/reception buffer 11026.

PLME-SAP frame transmission/reception buffer 11026 is a buffer for transmitting/receiving frames to/from PNC-PHY layer 11003. PNC-PHY layer 11003 and PNC-MAC layer 11002 are connected at a PHY frame data reception unit 11029 and, when data is provided from PNC-PHY layer 11003 to PHY frame data reception unit 11029, the input data is provided to PLME-SAP frame transmission/reception buffer 11026.

The PLME-SAP frame that is data input from PHY frame data reception unit 11029 to PLME-SAP frame transmission/reception buffer 11026 is provided to PLME-SAP frame analysis unit 11027 where the data in the PLME-SAP frame is analyzed. Then, the analyzed data and parameters are input, as reception analysis data, to PNC-MAC controller 11023.

Based on the reception analysis data that is input from PLME-SAP frame analysis unit 11027, PNC-MAC controller 11023 transmits information for generating a MLME-SAP frame to MLME-SAP frame generation unit 11028. PLME-SAP frame generation unit 11028 generates a NLME-SAP frame based on the information input from PNC-MAC controller 11023 and provides the generated frame to MLME-SAP frame transmission/reception buffer 11017. The MLME-SAP frame temporarily stored in MLME-SAP frame transmission/reception buffer 11017 is transmitted at a predetermined timing to MLME-SAP frame transmission/reception buffer 11014 of PNC-LINK layer 11001.

As described above, from the PNC that manages the piconet, beacon frames are transmitted to a DEV belonging to the piconet.

The information that a beacon frame is transmitted from PNC-PHY layer 11003 to the DEV is given to PNC-MAC layer 11002 by transmission of the PLME-SAP frame from PNC-PHY layer 11003 to PHY frame data reception unit 11029. PLME-SAP frame analysis unit 11027 inputs reception analysis data that is obtained by analyzing the PLME-SAP frame to PNC-MAC controller 11023.

PNC-MAC controller 11023 is connected to PNC cycle timer generation unit 11008 of PNC-LINK layer 11001 and directly inputs, based on the reception analysis data input from PLME-SAP frame analysis unit 11027, a beacon detection signal to PNC cycle timer generation unit 11008. The beacon detection signal that is input directly from PNC-MAC controller 11023 to PNC cycle timer generation unit 11008 is hereinafter referred to as beacon detection signal B.

Alternatively, PNC-MAC controller 11023 sends to MLME-SAP frame generation unit 11028 information for generating a MLME-SAP frame based on the reception analysis data input from PLME-SAP frame analysis unit 11027. As described above, PLME-SAP frame generation unit 11028 generates the MLME-SAP frame based on the information input from PNC-MAC controller 11023 and provides the generated frame to MLME-SAP frame transmission/reception buffer 11017 and the frame is transmitted as a beacon detection signal to MLME-SAP frame transmission/reception buffer 11014 of PNC-LINK layer 11001. The beacon detection signal provided to PNC-LINK layer 11001 as MLME-SAP frame data is hereinafter referred to as beacon detection signal A.

Further, PNC cycle timer generation unit 11008 receives the beacon detection signal that is beacon detection signal A or beacon detection signal B and uses the input beacon detection signal and the PNC-MAC clock generated by a clock generator (not shown) to generate a PNC cycle timer. The PNC cycle timer is described in detail hereinlater. Then, PNC cycle timer generation unit 11008 provides its generated PNC cycle timer to time stamp generation unit 11007 and PNC-LINK controller 11011. As for the beacon detection signal, one of beacon detection signal A and beacon detection signal B may be input to PNC cycle timer generation unit 11008 or both of the beacon detection signals may be input and one of them that is set in advance may be used for generating the PNC cycle timer.

Based on the PNC cycle timer provided from PNC cycle timer generation unit 11008, time stamp generation unit 11007 generates a time stamp at a predetermined timing based on the PNC-LINK clock. In other words, as described above, at a timing based on the time at which the MPEG2-TS data is output from FIFO 11005, the time stamp is generated. The generated time stamp is then provided to buffer management unit 11006.

Figure 3:
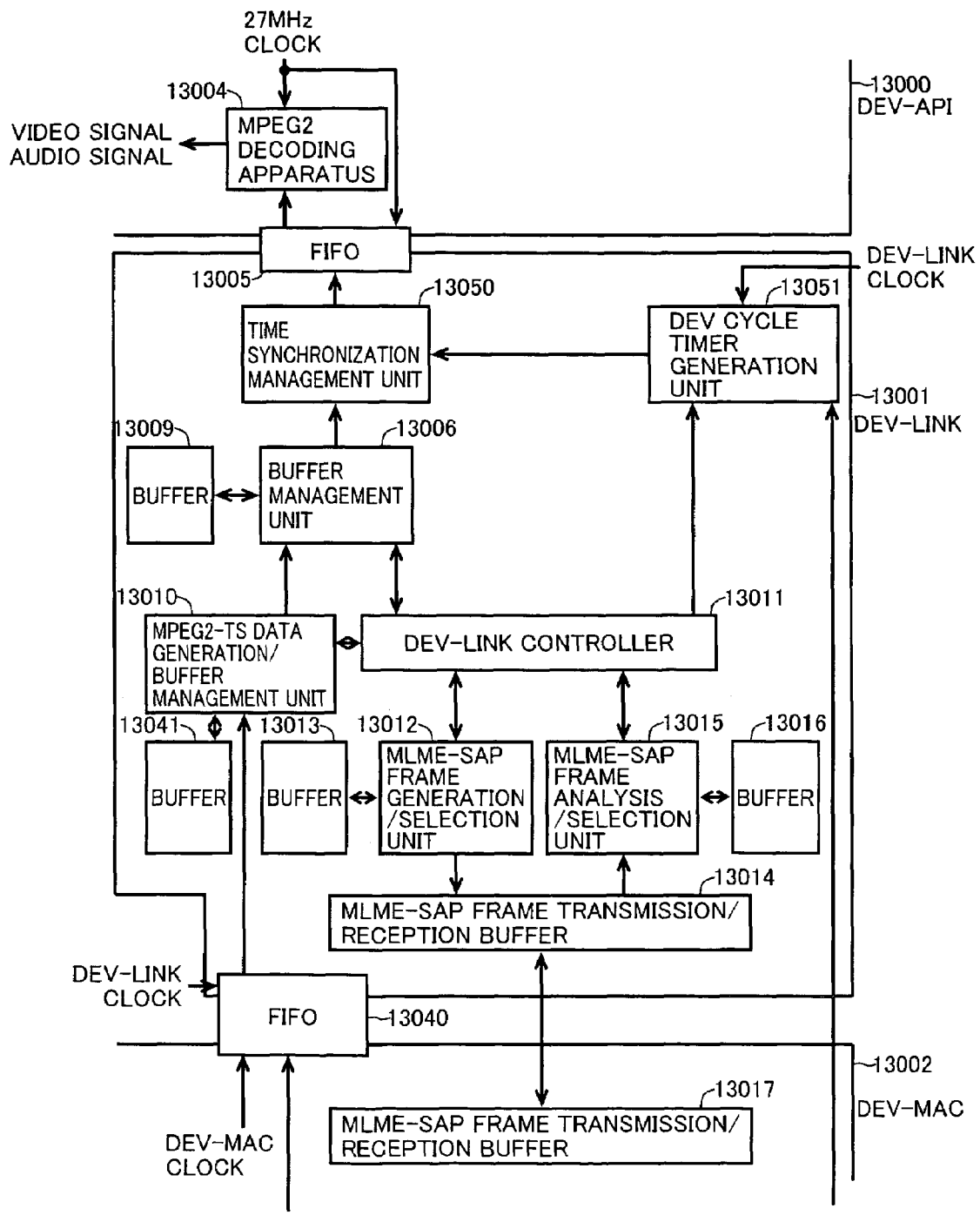
FIG. 3 shows a configuration of a DEV in the present embodiment, particularly a specific example of the configuration from an application layer (DEV-API) to a MAC layer (DEV-MAC).
Figure 4:
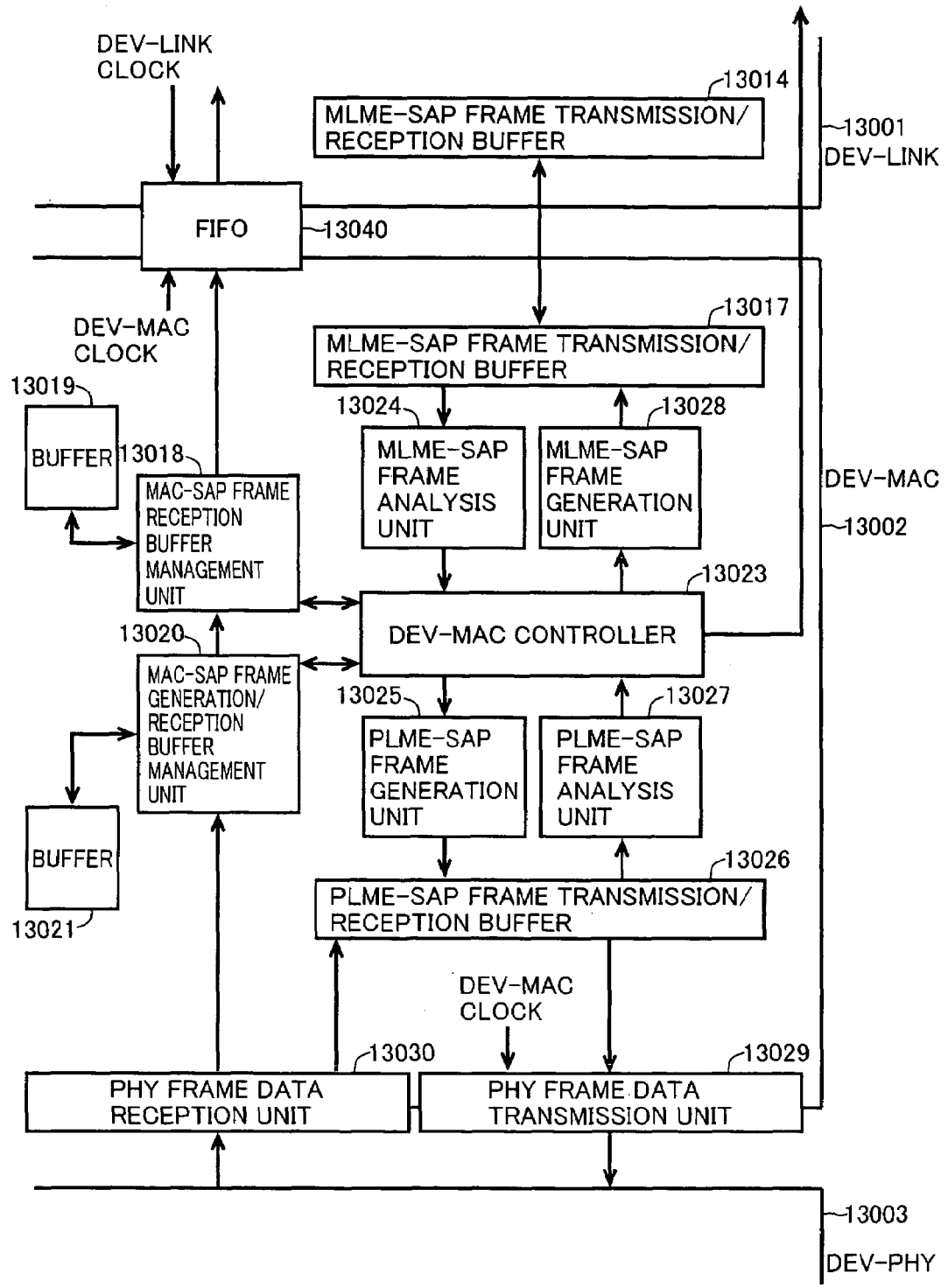
FIG. 4 shows the configuration of the DEV in the present embodiment, particularly a specific example of the configuration from a LINK layer (DEV-LINK) to a physical layer (DEV-PHY).

With reference to FIGS. 3 and 4, a configuration of a DEV, particularly the configuration from an application layer (DEV-API) to a physical layer (DEV-PHY) is described.

The configuration of the DEV is similar to that of the PNC described in connection with FIGS. 1 and 2 except that the DEV is a reception apparatus that receives MPEG2-TS data transmitted from the PNC and thus the direction of input of the MPEG2-TS data is opposite and that the DEV includes a time synchronization management unit 13050 and a DEV cycle timer generation unit 13051, for example.

First, following a flow of the MPEG2-TS data provided from the PNC, the configuration of the DEV is described.

Referring to FIG. 4, a DEV-MAC layer 13002 is controlled as a whole by a DEV-MAC controller 13023. DEV-MAC controller 13023 communicates control information with a MAC-SAP frame reception buffer management unit 13018 and a MAC-SAP frame generation and reception buffer management unit 13020 and controls them. Further, DEV-MAC controller 13023 obtains analysis information from a MLME-SAP frame analysis unit 13024 and a PLME-SAP frame analysis unit 13027 to output control information to a MLME-SAP frame generation unit 13028 and a PLME-SAP frame generation unit 13025 and controls them.

A PHY frame data reception unit 13030 receives MPEG2-TS data with a time stamp added thereto that is provided from the PNC and received in a DEV-PHY layer 13003 which is a layer at a lower level, as a PHY frame conforming to a method of access through a PHY-SAP that is an interface point between DEV-MAC layer 11302 and DEV-PHY layer 13003. The PHY-SAP frame thus received is provided to MAC-SAP frame generation and reception buffer management unit 13020.

MAC-SAP frame generation and reception buffer management unit 13020 is a component that generates a MAC-SAP frame conforming to a method of access through a MAC-SAP that is an interface point between a DEV-LINK layer 13001 and DEV-MAC layer 13002. MAC-SAP frame generation and reception buffer management unit 13020 generates, according to control information from DEV-MAC controller 13023, the MAC-SAP frame based on the PHY frame provided from PHY frame data reception unit 13030, and writes the frame in MAC-SAP frame reception buffer management unit 13018. When the MAC-SAP frame is written, a buffer 13021 managed by MAC-SAP frame generation and reception buffer management unit 13020 is used for adjustments of the timing at which the generated MAC-SAP frame is output to the MAC-SAP frame reception buffer management and for absorbing processing time delay of the MAC-SAP frame generation process. Further, MAC-SAP frame generation and reception buffer management unit 13020 manages overflow of buffer 13021 that it manages and the timing at which the MAC-SAP frame is output to MAC-SAP frame reception buffer management unit 13018 and transmits the control information to MAC-MAC controller 13023.

MAC-SAP frame reception buffer management unit 13018 writes, according to control information from DEV-MAC controller 11023, the MAC-SAP frame provided from MAC-SAP frame generation and reception buffer management unit 13020 into a FIFO 13040 at a predetermined timing based on a clock (DEV-MAC clock) of DEV-MAC layer 13002. At this time, the MAC-SAP frame is temporarily stored in a buffer 13019.

Buffer 13019 is a buffer managed by MAC-SAP frame reception buffer management unit 13018 and used, with the purpose of providing data to DEV-LINK layer 13001, for waiting for transmission when the MAC-SAP frame is to be transmitted from MAC-SAP frame reception buffer management unit 13018 to FIFO 13040.

Further, according to control information from DEV-MAC controller 13023, MAC-SAP frame reception buffer management unit 13018 manages overflow of buffer 13019 that it manages and the timing at which the MAC-SAP frame is output to FIFO 13040 and sends control information to DEV-MAC controller 13023.

FIFO 13040 connects DEV-LINK layer 13001 to DEV-MAC layer 13002. Receiving input of a clock of DEV-LINK layer 13001 (DEV-LINK clock) generated by a clock generator (not shown), FIFO 13040 reads the MAC-SAP frame written by MAC-SAP frame reception buffer management unit 13018 at a predetermined timing based on the DEV-LINK clock.

Referring then to FIG. 3, DEV-LINK layer 13001 is controlled as a whole by a DEV-LINK controller 13011. DEV-LINK controller 13011 communicates control information with a buffer management unit 13006 to control buffer management unit 13006, and obtains, from buffer management unit 13006, such information as overflow of buffer 13009 managed by buffer management unit 13006 and the output status of data to MAC-SAP frame generation and buffer management unit 13010. Further, DEV-LINK controller 13011 communicates control information with MPEG2-TS data generation and buffer management unit 13010 to control MAC-SAP frame generation and buffer management unit 13010 and obtains, from MPEG2-TS data generation and buffer management unit 13010, such information as overflow of buffer 13041 managed by MPEG2-TS data generation and buffer management unit 13010, input status of data from FIFO 13040 and parameters written when the MPEG2-TS data is generated, for example. Similarly, DEV-LINK controller 13011 communicates control information with MLME-SAP frame generation and selection unit 13012 and MLME-SAP frame analysis and selection unit 13015 to control them.

The MAC-SAP frame read from FIFO 13040 is provided to MPEG2-TS generation and buffer management unit 13010. The MAC-SAP frame that is provided from FIFO 13040 and written by MAC-SAP frame reception buffer management unit 13018 of DEV-MAC layer 13002 is provided to MPEG2-TS data generation and buffer management unit 13010.

MPEG2-TS data generation and buffer management unit 13010 restructures the MPEG2-TS data, according to control information from DEV-LINK controller 13011, based on the MAC-SAP frame provided from FIFO 13040. The structured MPEG2-TS data is then written in buffer management unit 13006. At this time, buffer 13041 managed by MPEG2-TS data generation and buffer management unit 13010 is used for adjustments of the timing at which the MAC-SAP frame is input from FIFO 11040 and for absorbing processing time delay of the MPEG2-TS data structuring process.

Buffer management unit 13006 provides, according to control information from DEV-LINK controller 13011, the MPEG2-TS data provided from MPEG2-TS data generation and buffer management unit 13010, to time synchronization management unit 13050. At this time, buffer 13009 managed by buffer management unit 13006 is used as a temporary buffer.

Time synchronization management unit 13050 obtains a generated DEV cycle timer from DEV cycle timer generation unit 13051 and, based on the DEV cycle timer and a time stamp added to the MPEG2-TS data, adjusts the timing at which the MPEG2-TS data is output to a FIFO 13005. It also determines whether or not the MPEG2-TS data is output to FIFO 13005. The generation of the DEV cycle timer by DEV cycle timer generation unit 13051 is described hereinlater. At a predetermined timing that is adjusted, time synchronization management unit 13050 outputs, to FIFO 13005, relevant MPEG2-TS data among MPEG2-TS data provided from buffer management unit 13006.

FIFO 13005 is a buffer connecting a DEV-API layer 13000 and DEV-LINK layer 13001. FIFO 13005 reads the MPEG2-TS data stored by time synchronization management unit 13050 at a predetermined timing based on the timing of output from time synchronization management unit 13050 to FIFO 13005, and provides the read data to a MPEG2 decoding apparatus 13004 of DEV-API layer 13000. MPEG2 decoding apparatus 13004 decodes the MPEG2-TS data provided from FIFO 13005 to generate a video signal (VIDEO) and outputs the signal from an output unit (not shown). MPEG2 decoding apparatus 13004 is similar in configuration to the conventional MPEG2 decoding apparatus described above in connection with FIG. 20.

Following a flow of control data, the configuration of the DEV is now described.

When the control data is to be transmitted from DEV-LINK controller 13011 through DEV-MAC layer 13002, DEV-LINK controller 13011 sends transmission control data to MLME-SAP frame generation and selection unit 13012.

MLME-SAP frame generation and selection unit 13012 generates, based on the transmission control data input from DEV-LINK controller 13011, a MLME-SAP frame conforming to a method of access through the MLME-SAP that is an interface point of the control information between DEV-LINK layer 13001 and DEV-MAC layer 13002. Then, MLME-SAP frame generation and selection unit 13012 temporarily stores the generated MLME-SAP frame in buffer 13013.

Usually, MLME-SAP frame generation and selection unit 13012 provides MLME-SAP frames stored in buffer 13013 sequentially to MLME-SAP frame transmission/reception buffer 13014. When priority transmission information indicating the priority of transmission is received from DEV-LINK controller 13011, it is determined whether a relevant MLME-SAP frame should be given priority to be transmitted, based on the priority transmission information. An example of the MLME-SAP frame data having a high priority is time information described below for example.

The MLME-SAP frame selected by MLME-SAP frame generation and selection unit 13012 is provided to MLME-SAP frame transmission/reception buffer 13014. MLME-SAP frame transmission/reception buffer 13014 transmits/receives the MLME-SAP frame to/from a MLME-SAP frame transmission/reception buffer 13017 of DEV-MAC layer 13002.

In contrast, when control data is to be received by DEV-LINK controller 13011 through DEV-MAC layer 13002, a MLME-SAP frame received from MLME-SAP frame transmission/reception buffer 13017 of DEV-MAC layer 13002 is input from MLME-SAP frame transmission/reception buffer 13014 to MLME-SAP frame analysis and selection unit 13015.

MLME-SAP frame analysis and selection unit 13015 analyzes contents (frame type, data contents and parameters for example) of the MLME-SAP frame input from MLME-SAP frame transmission/reception buffer 13014 and selects a MLME-SAP frame to be provided to DEV-LINK controller 13011. At this time, such control data information as time information for example designated by priority setting control data information described hereinlater is given priority over other reception control data to be provided to DEV-LINK controller 13011.

Referring again to FIG. 4, the MLME-SAP frame communicated with MLME-SAP frame transmission/reception buffer 13014 of DEV-LINK layer 13001 is temporarily stored in NLME-SAP frame transmission/reception buffer 13017 of DEV-MAC layer 13002.

The MLME-SAP frame received from MLME-SAP frame transmission/reception buffer 13014 of DEV-LINK layer 13001 is provided from MLME-SAP frame transmission/reception buffer 13017 of DEV-MAC layer 13002 to MLME-SAP frame analysis unit 13024 and control information (data and parameters for example) in the MLME-SAP frame is analyzed. Analysis control data is then provided to DEV-MAC controller 13023.

DEV-MAC controller 13023 transmits, to PLME-SAP frame generation unit 13025, information for generating a PLME-SAP frame conforming to a method of access through a PLME-SAP that is an interface point of control information between DEV-MAC layer 13002 and DEV-PHY layer 13003, based on contents of the analysis control data included in the MLME-SAP frame provided from MLME-SAP frame analysis unit 13024. PLME-SAP frame generation unit 13025 generates the PLME-SAP frame based on the information input from DEV-MAC controller 13023 and provides the frame to PLME-SAP frame transmission/reception buffer 13026.

PLME-SAP frame transmission/reception buffer 11026 is a buffer for transmitting/receiving frames to/from DEV-PHY layer 13003. DEV-PHY layer 13003 and DEV-MAC layer 13002 are connected by a PHY frame data transmission unit 13029. When the PLME-SAP frame is input from PLME-SAP frame generation unit 13025 to PLME-SAP frame transmission/reception buffer 11026, the frame is provided to PHY frame data transmission unit 13029 for transmission to DEV-PHY layer 13003. Further, when data is received from DEV-PHY layer 13003 to PHY frame data reception unit 13030, the input data is provided to PLME-SAP frame transmission/reception buffer 11026.

The PLME-SAP frame that is the data input from PHY frame data reception unit 13030 to PLME-SAP frame transmission/reception buffer 13026 is provided to PLME-SAP frame analysis unit 13027 where data in the PLME-SAP frame is analyzed. The analyzed data and parameters are input as reception analysis data to DEV-MAC controller 13023.

DEV-MAC controller 13023 transmits, to MLME-SAP frame generation unit 13028, information for generating a MLME-SAP frame, based on the reception analysis data input from PLME-SAP frame analysis unit 13027. PLME-SAP frame generation unit 13028 generates, based on the information input from DEV-MAC controller 13023, a MLME-SAP frame and provides the frame to MLME-SAP frame transmission/reception buffer 13017. The MLME-SAP frame stored temporarily in MLME-SAP frame transmission/reception buffer 13017 is transmitted, at a predetermined timing, to MLME-SAP frame transmission/reception buffer 13014 of DEV-LINK layer 13001.

As described above, the PNC that manages the piconet transmits a beacon frame to DEVs belonging to the piconet.

The information that a beacon frame is transmitted from the PNC is given to DEV-MAC layer 13002 by transmission of a PLME-SAP frame from DEV-PHY layer 13003 to PHY frame data reception unit 13030. PLME-SAP frame analysis unit 13027 inputs reception analysis data obtained by analyzing the PLME-SAP frame to DEV-MAC controller 13023.

PNC-MAC controller 13023 is connected to DEV cycle timer generation unit 13051 of DEV-LINK layer 13001 and directly inputs a beacon detection signal to DEV cycle timer generation unit 13051 based on the reception analysis data input from PLME-SAP frame analysis unit 13027. This beacon detection signal input directly from DEV-MAC controller 13023 to DEV cycle timer generation unit 13051 is hereinafter referred to as beacon detection signal B.

Alternatively, based on the reception analysis data input from PLME-SAP frame analysis unit 13027, DEV-MAC controller 13023 transmits information for generating a MLME-SAP frame to MLME-SAP frame generation unit 13028. PLME-SAP frame generation unit 13028 generates the MLME-SAP frame based on the information input from DEV-MAC controller 13023 as discussed above and provides the generated frame to MLME-SAP frame transmission/reception buffer 13017 and the frame is transmitted as a beacon detection signal to MLME-SAP frame transmission/reception buffer 13014 of DEV-LINK layer 13001. The beacon detection signal provided as MLME-SAP frame data to DEV-LINK layer 13001 is hereinafter referred to as beacon detection signal A.

DEV cycle timer generation unit 13051 receives the beacon detection signal that is beacon detection signal A or beacon detention signal B, uses the input beacon detection signal and a DEV-MAC clock generated by a clock generator (not shown) and generates a DEV cycle timer. Using the generated DEV cycle timer as well as a PNC cycle timer obtained from the beacon detection signal, the DEV cycle timer is adjusted. This process is hereinlater detailed. DEV cycle timer generation unit 13051 provides the adjusted DEV cycle timer to time synchronization management unit 13050. As for the beacon detection signal, one of beacon detection signal A and beacon detection signal B may be input to PNC cycle timer generation unit 11008 or both of the beacon detection signals may be input and one of the beacon detection signals that is set in advance may be used for generating the DEV cycle timer.

A configuration of PNC cycle timer generation unit 11008 shown in FIG. 1 is now described in connection with FIG. 5.

Figure 5:
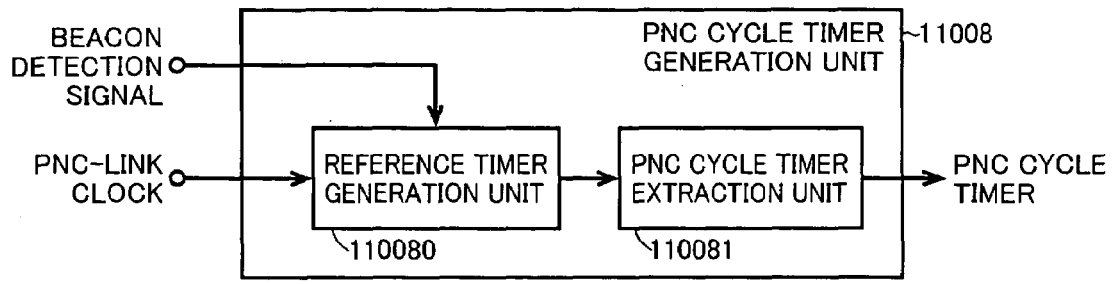
FIG. 5 shows a specific example of a configuration of a PNC cycle timer generation unit 11008.

Referring to FIG. 5, PNC cycle timer generation unit 11008 is configured to include a reference timer generation unit 110080 and a PNC cycle timer extraction unit 110081.

Reference timer generation unit 110080 receives the PNC-LINK clock to count up and receives the beacon detection signal to reset the count.

PNC cycle timer extraction unit 110081 extracts the counter value of reference timer generation unit 110080 to output it as a PNC cycle timer.

A configuration of DEV cycle timer generation unit 13051 shown in FIG. 3 is described in connection with FIG. 6.

Figure 6:
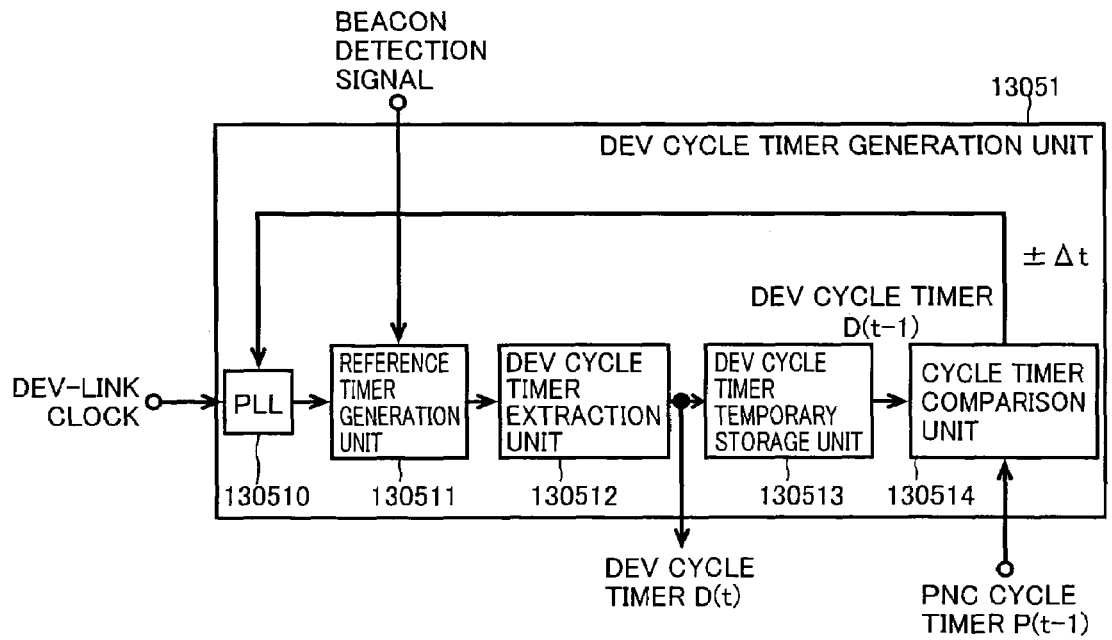
FIG. 6 shows a specific example of a configuration of a DEV cycle timer generation unit 13051.

Referring to FIG. 6, DEV cycle timer generation unit 13051 is configured to include a PLL (Phase Locked Loop) 130510, a reference timer generation unit 130511, a DEV cycle timer extraction unit 130512, a DEC cycle timer temporary storage unit 130513, and a cycle timer comparison unit 130514.

PLL 130510 detects a phase difference between an output frequency and an input or reference frequency to control a feedback circuit and establish matching (synchronization) between the frequencies, receiving an input of the DEV-LINK clock and an input of a comparison value from cycle timer comparison unit 130514 that is described hereinlater to correct the DEV-LINK clock.

Reference timer generation unit 130511 counts up the corrected clock signal that is input from PLL 130510 and receives an input of the beacon detection signal to reset the count.

DEV cycle timer extraction unit 130512 extracts the counter value of reference timer generation unit 130511, outputs it as a DEV cycle timer D(t) to DEV cycle timer temporary storage unit 130513 for storing the counter value therein.

Cycle timer comparison unit 130514 compares a former DEV cycle timer D(t−1) stored in DEV cycle timer temporary storage unit 130513 with the PNC cycle timer P(t−1) obtained through extraction from the beacon detection signal to obtain the difference (±Δ) therebetween. Cycle timer comparison unit 130514 inputs a comparison value based on the difference (±Δ) to PLL 130510.

PLL 130510 uses the comparison value that is the difference (+Δ) for example as described above to correct the input DEV cycle timer.

A method of correcting the aforementioned DEV cycle timer is described in connection with FIG. 7.

Figure 7:
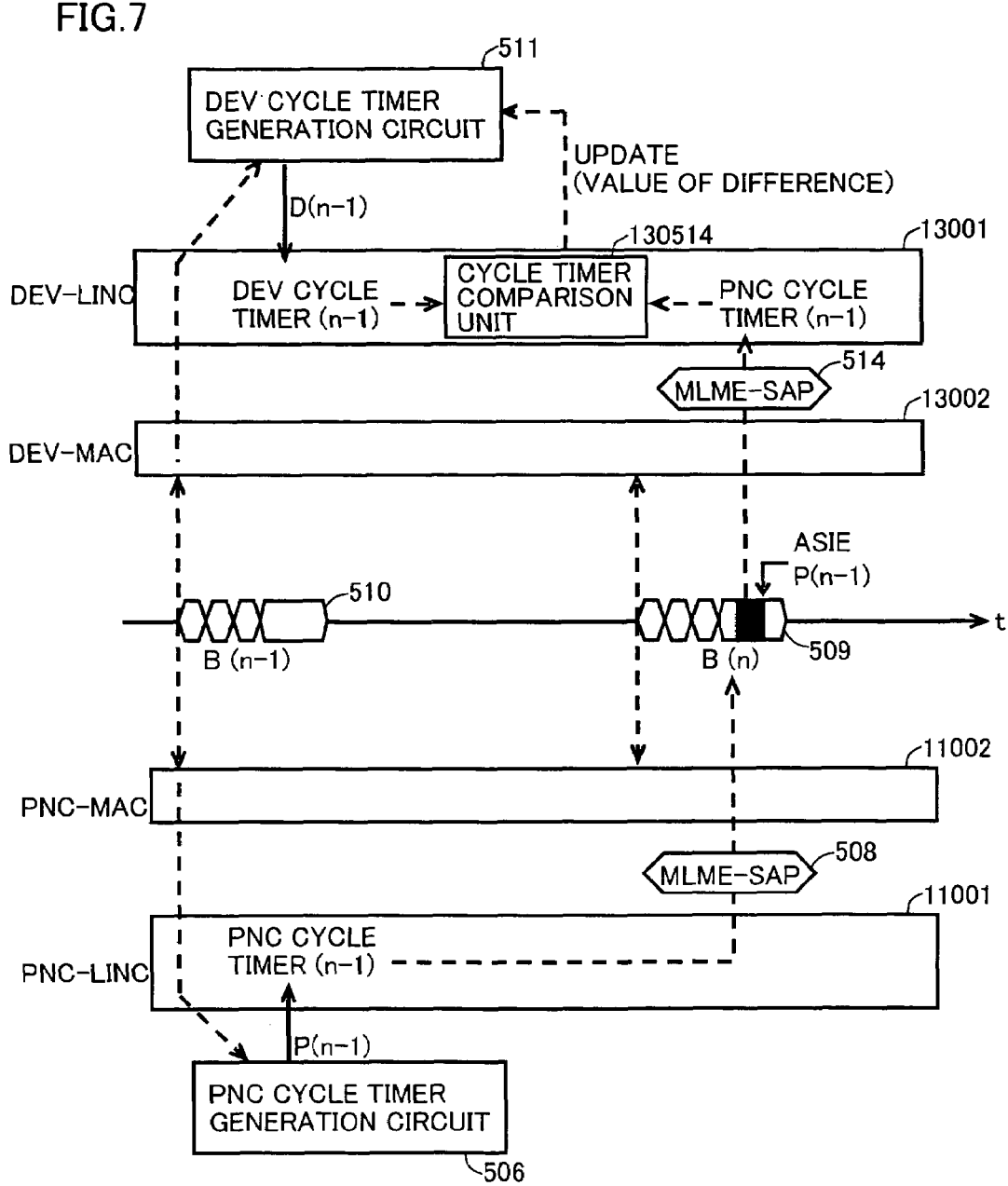
FIG. 7 illustrates how to correct a DEV cycle timer.

Referring to FIG. 7, when reception of a (n−1)-th beacon frame B(n−1) 510 is detected in DEV-MAC layer 13002, a beacon detection signal is transmitted from DEV-MAC 13002 to DEV-LINK layer 13001. At this time, the beacon detection signal is transmitted as beacon detection signal A to which a higher priority is given over other data through the MLME-SAP, or transmitted as beacon detection signal B directly without being passed through the MLME-SAP. Similarly, when transmission of beacon frame B(n−1) 510 is detected in PNC-MAC layer 11002, a beacon detection signal is transmitted as beacon detection signal A or beacon detection signal B from PNC-MAC 11002 to PNC-LINK layer 11001.

Here, an internal timer of reference timer generation unit 110080 of PNC cycle timer generation unit 11008 in PNC-LINK layer 11001 and an internal timer of reference timer generation unit 130511 of DEV cycle timer generation unit 13051 in DEV-LINK layer 13001 have an initial value of 0 as described above.

A PNC cycle timer generation circuit 506 included in PNC-LINK layer 11001 and configured to include PNC cycle timer generation unit 11008 generates a PNC cycle timer P(t−1) based on the beacon detection signal of beacon frame B(n−1) 510. Based on the generated PNC cycle timer P(t−1), MLME-SAP frame generation and selection unit 11012 (see FIG. 1) of PNC-LINK layer 11001 generates a MLME-SAP frame that is transmitted through a MLME-SAP 508 to PNC-MAC layer 11002.

In PNC-MAC layer 11002, when a beacon frame B(n) 509 is generated that is to be transmitted next, PLME-SAP frame generation unit 11025 adds the PNC cycle timer P(t−1) as ASIE information to the PLME-SAP frame that is a beacon frame and the frame is transmitted to the DEV.

A DEV cycle timer generation circuit 511 included in DEV-LINK layer 13001 and configured to include DEV cycle timer generation unit 13051 generates a DEV cycle timer D(n−1) based on the beacon detection signal of beacon frame B(n−1) and outputs the timer to cycle timer comparison unit 130514.

Then, regarding beacon frame B(n) 509 that is transmitted from the PNC, if the PNC cycle timer P(n−1) is added as ASIE information in beacon frame 509 in DEV-MAC layer 13002, DEV-LINK layer 13001 obtains PNC cycle timer P(n−1) through a MLME-SAP 514 and provides the timer to cycle timer comparison unit 130514 included in DEV cycle timer generation unit 13051.

Cycle timer comparison unit 130514 compares DEV cycle timer D(n−1) with PNC cycle timer P(n−1) and outputs the value of the difference as an update information value to DEV cycle timer generation circuit 511. PLL 130510 (see FIG. 6) included in DEV cycle timer generation circuit 511 corrects the generated DEV cycle timer D(n−1) based on the update information value.

Thus, in the present embodiment, the DEV corrects the DEV cycle timer using the PNC cycle timer transmitted from the PNC and the DEV cycle timer generated in the DEV based on the DEV-LINK clock to ensure synchronization between the PNC cycle timer and the DEV cycle timer.

In the present embodiment described above, the PNC cycle timer corresponding to each of the intervals at which the beacon frames are transmitted is added to the beacon frame that is transmitted from the PNC, and DEV corrects the DEV cycle timer accordingly. However, if the beacon frames are transmitted at constant intervals determined in advance and the intervals are known to the DEV, it may be unnecessary to add the PNC cycle timer to the beacon frame to be transmitted to the DEV. In other words, in the above-described process, the DEV cycle timer generated from the beacon detection signal may be compared with the interval instead of the PNC cycle timer in the DEV-LINK to correct the DEV cycle timer by the DEV according to itself.

Further, according to the specific description above, the PNC cycle timer corresponding to each of the intervals at which the beacon frames are transmitted is added to the beacon frame that is transmitted from the PNC and the DEV accordingly corrects the DEV cycle timer. Therefore, even if the beacon transmission intervals are not fixed, the DEV cycle timer can be corrected in the DEV.

Moreover, in the PNC and the DEV of the present embodiment, the beacon detection signal is given priority over other data to be transmitted from the MAC layer to the LINK layer and thus transmission delay is unlikely to occur. Therefore, the cycle timer can more accurately be generated based on the time at which the beacon is detected. A description is now given below of each configuration and process for giving priority to the beacon detection signal over other data and transmitting the beacon detection signal as beacon detection signal A or beacon detection signal B from the MAC layer to the LINK layer.

Figure 8:
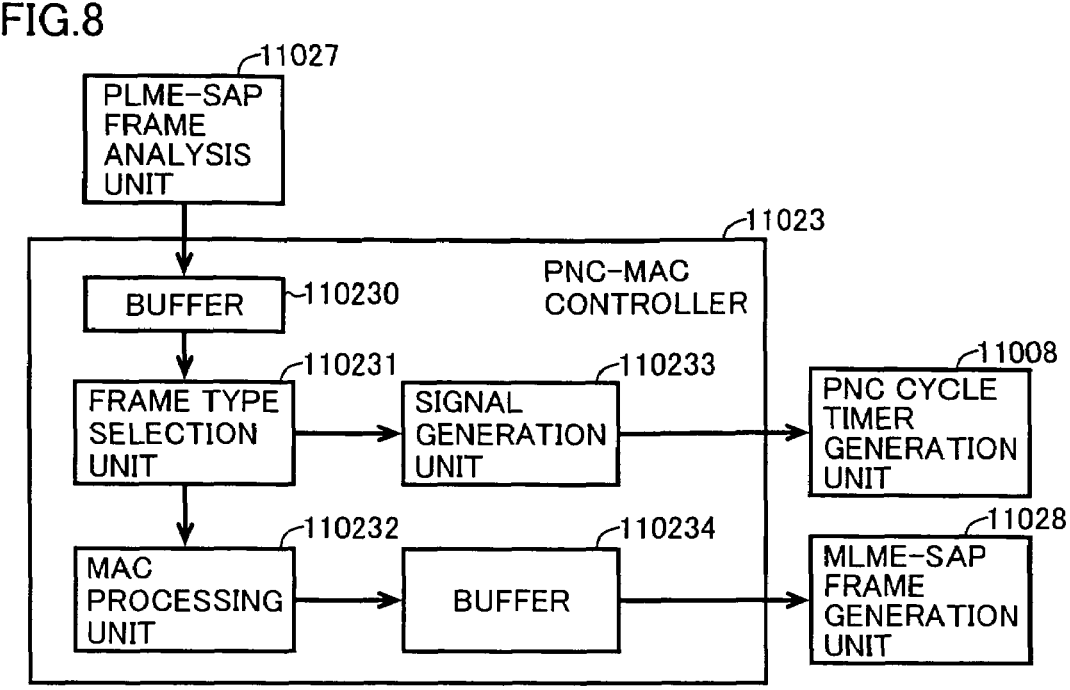
FIG. 8 shows a specific example of a configuration of a PNC-MAC controller 11023 in the case where a beacon detection signal is transmitted as beacon detection signal B directly from the PNC-MAC layer 11002 to the PNC-LINK layer 11001.

In connection with FIG. 8 first, a description is given of a configuration of PNC-MAC controller 11023 in the case where the beacon detection signal is transmitted as beacon detection signal B directly from PNC-MAC layer 11002 to PNC-LINK layer 11001.

Referring to FIG. 8, in the case where the beacon detection signal is transmitted as beacon detection signal B directly from the MAC layer to the LINK layer, PNC-MAC controller 11023 is configured to include buffers 110230, 110234, a frame type selection unit 110231, a MAC processing unit 110232 and a signal generation unit 110233. Signal generation unit 110233 is connected to PNC cycle timer generation unit 11008 of PNC-LINK layer 11001.

As discussed in connection with FIG. 2, PLME-SAP frame analysis unit 11027 reads and analyzes a PLME-SAP frame stored in PLME-SAP frame transmission/reception buffer 11026. The PLME-SAP frame analyzed here is a data structure having beacon information indicating that the frame is a beacon and included in a header for example, or a data structure integrated therein parameters and data necessary for processing in PNC-MAC layer 11002. Specifically, PLME-SAP frame analysis unit 11027 analyzes a PLME-SAP header added to the PLME-SAP frame and the data of the PLME-SAP frame with the header removed is input to PNC-MAC controller 11023. The input data (PLME-SAP frame) is temporarily stored in buffer 110230.

When data has been input to buffer 110230, frame type selection unit 110231 reads the data from buffer 110230 to analyze its contents (frame type). According to the results of the analysis, the selection unit provides the data to signal generation unit 110233 or MAC processing unit 110232.

Signal generation unit 110233 generates a beacon detection signal indicating detection of the beacon frame based on the data from frame type selection unit 110231. The generated beacon detection signal is directly output, as beacon detection signal B, to PNC cycle timer generation unit 11008 of PNC-LINK layer 1101 to which it is connected.

MAC processing unit 110232 performs MAC processing on the data provided from frame selection unit 110231 that is appropriate for the data, generates a transmission packet as required to store the packet in buffer 110234. The data stored in buffer 110234 are transmitted successively to MLME-SAP frame generation unit 11028.

Figure 9:
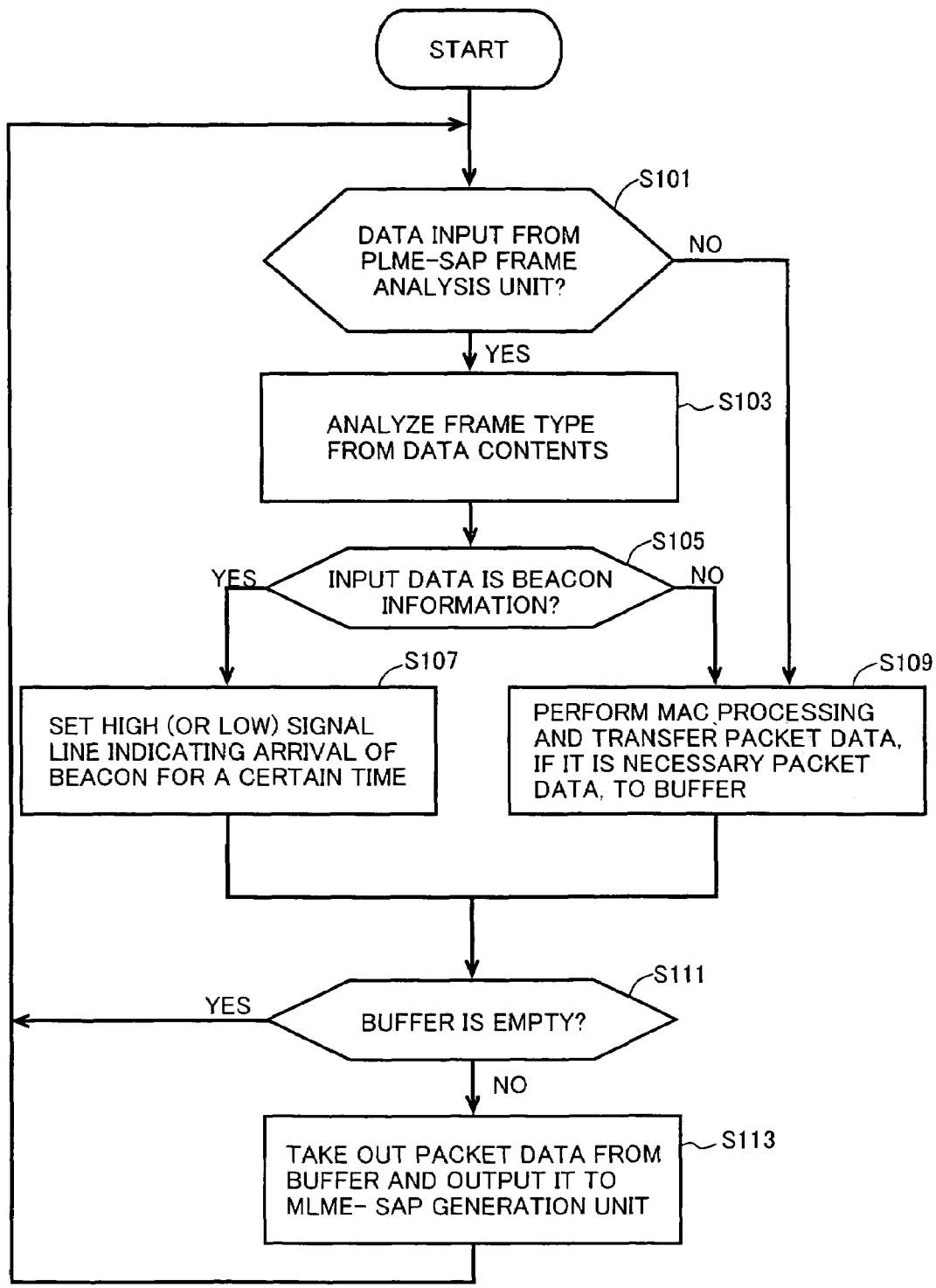
FIG. 9 is a flowchart showing a flow of a process of transmitting the beacon detection signal as beacon detection signal B directly from the PNC-MAC layer 11002 to the PNC-LINK layer 11001.

Further, in connection with FIG. 9, a description is given of a flow of the process in the case where the beacon detection signal is transmitted as beacon detection signal B directly from PNC-MAC layer 11002 to PNC-LINK layer 11001.

Referring to FIG. 9, it is first determined whether data (PLME-SAP frame) is input from PLME-SAP frame analysis unit 11027 to buffer 110230 (S101). When the data is input from PLME-SAP frame analysis unit 11027 to buffer 110230 (YES in S101), the data is analyzed by frame type selection unit 110231 (S103). Here, it is determined whether the data includes beacon information or other data.

When the result of the analysis in step S103 shows that the data is data including beacon information (YES in S105), signal generation unit 110233 generates a beacon detection signal indicative of the detection of the beacon and the signal is output to PNC cycle timer generation unit 11008 of PNC-LINK layer 1101 (S107). Here, in synchronization with the PNC-MAC clock signal of PNC-MAC layer 11002, a signal of "High" or "Low" is output as beacon detection signal B to PNC cycle timer generation unit 11008 in a predetermined period of time corresponding to the time of one clock to which a predetermined time is added.

In contrast, when the result of the analysis in step S103 does not indicate that the data includes beacon information (NO in S105), parameters are set according to the data and MAC processing unit 110232 performs MAC processing. Depending on the data, namely if the data is to be transferred to PNC-LINK layer 11001, a transmission packet is generated based on the data and output to buffer 110234 (S109).

When it is determined in step S101 that data is not input to buffer 110230 (NO in S101), steps S103, S105 described above are skipped and the MAC processing in step S109 is performed.

In buffer 110234, it is determined all the time whether the buffer is empty or not (S111) and, if the buffer is not empty (NO in S111), data in the buffer is successively output to MLME-SAP frame generation unit 11028 (S113). The process is then returned to step S101, namely the determination as to whether data is input to buffer 110230.

Figure 10:
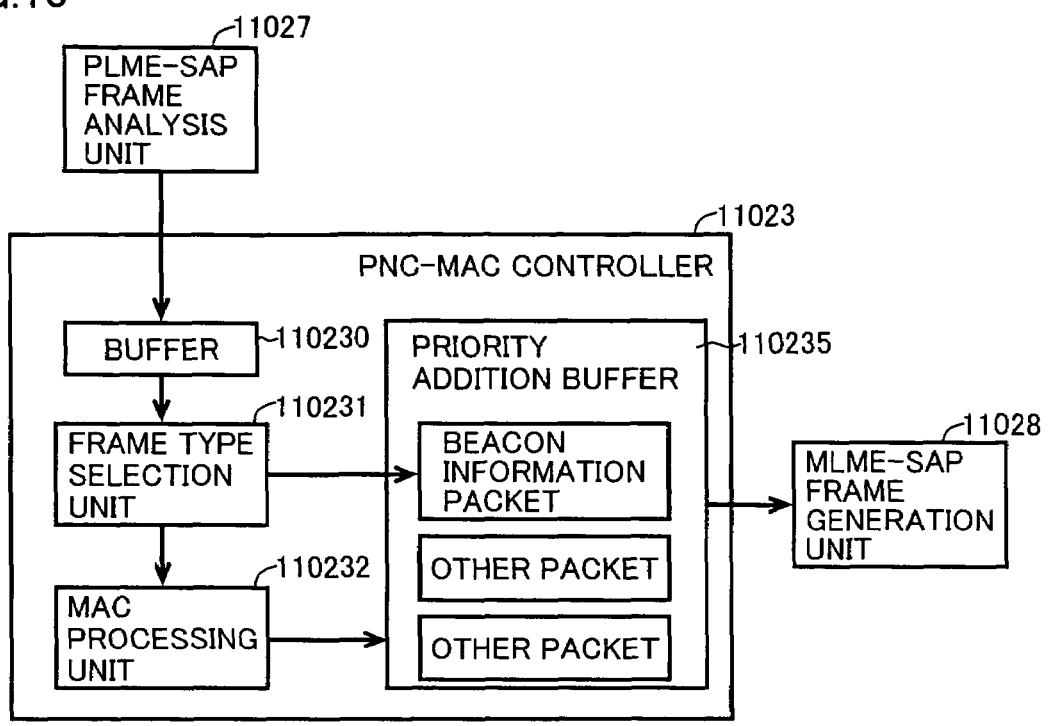
FIG. 10 shows a specific example of the configuration of the PNC-MAC controller 11023 in the case where a beacon detection signal is transmitted as beacon detection signal A with priority given thereto from the PNC-MAC layer 11002 to the PNC-LINK layer 11001 through a MLME-SAP.

Then, in connection with FIG. 10, a description is given of PNC-MAC controller 11023 in the case where the beacon detection signal is given priority to be transmitted as beacon detection signal A from PNC-MAC layer 11002 through the MLME-SAP to PNC-LINK layer 11001.

Referring to FIG. 10, in the case where the beacon detection signal is given priority to be transmitted as beacon detection signal A from PNC-MAC layer 11002 through the MLME-SAP to PNC-LINK layer 11001, PNC-MAC controller 11023 shown in FIG. 8 is configured to include buffer 110230, frame type selection unit 110231, and MAC processing unit 110232 and additionally include a priority addition buffer 110235.

As discussed in connection with FIG. 2, PLME-SAP frame analysis unit 11027 reads and analyzes a PLME-SAP frame stored in PLME-SAP frame transmission/reception buffer 11026 and inputs the data of the PLME-SAP frame with the header removed to PNC-MAC controller 11023. The input data (PLME-SAP frame) is temporarily stored in buffer 110230.

When data has been input to buffer 110230, frame type selection unit 110231 reads the data from buffer 110230 and analyzes the contents (frame type). If the data is the one including beacon information, the beacon information is extracted from the data and a beacon information packet is generated that is stored, in priority addition buffer 110235, together with an identifier indicating the priority level (for example, such numerals as 5 indicating high, 3 indicating normal and 1 indicating low). When the data does not include beacon information, the data is provided to MAC processing unit 110232.

MAC processing unit 110232 performs MAC processing on the data provided from frame type selection unit 11231, generates, as required, a transmission packet, and stores it together with the identifier in priority addition buffer 110235.

Packets stored in priority addition buffer 110235 are output, in the order changed depending on the priority indicated by the added identifier, to MLME-SAP frame generation unit 11028.

In connection with FIG. 11, a description is given below of a flow of the process in the case where the beacon detection signal is given priority to be transmitted as beacon detection signal A from PNC-MAC layer 11002 to PNC-LINK layer 11001 through the MLME-SAP.

Figure 11:
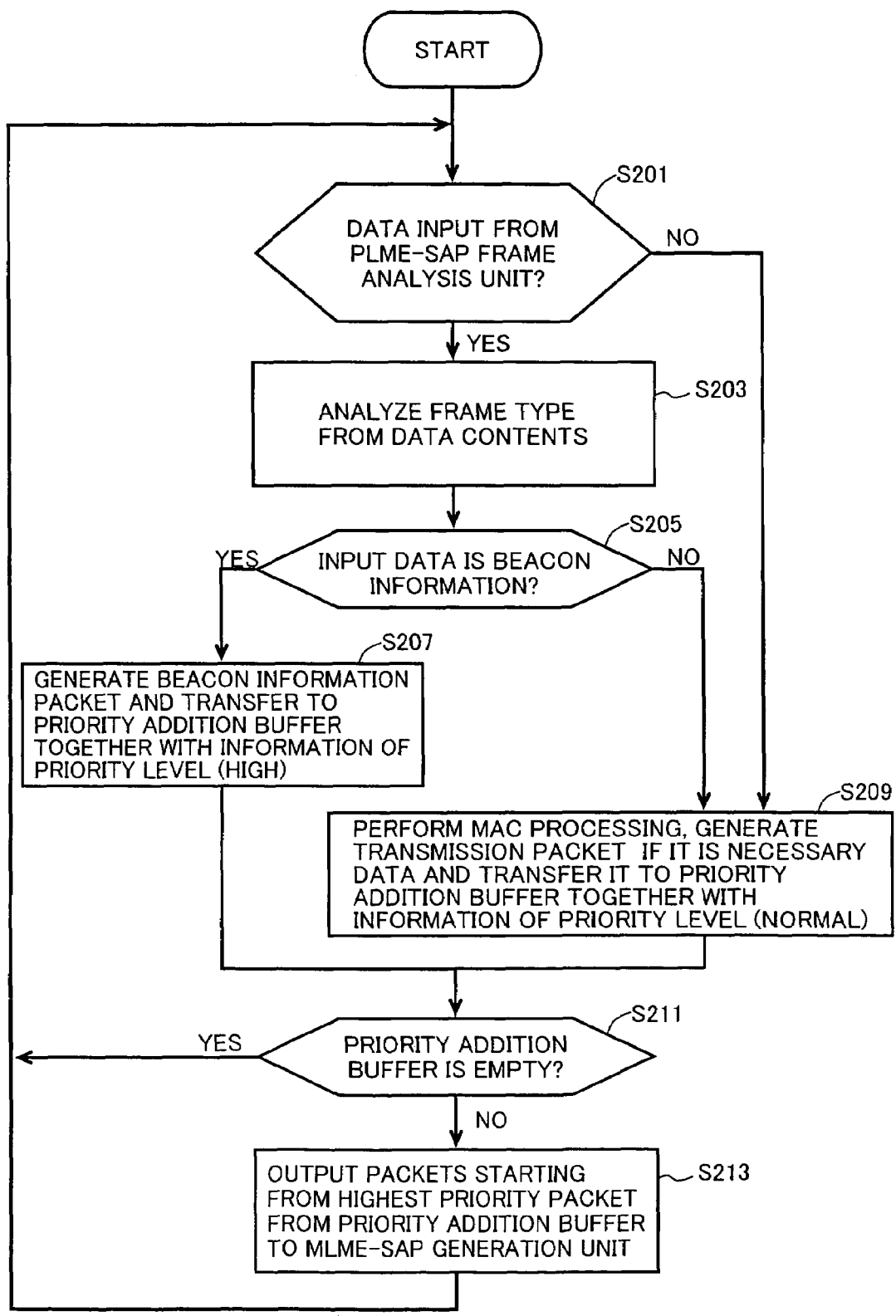
FIG. 11 is a flowchart showing a flow of a process of transmitting the beacon detection signal as beacon detection signal A with priority given thereto from the PNC-MAC layer 11002 to the PNC-LINK layer 11001 through the MLME-SAP.

Referring to FIG. 11, it is determined first whether or not data (PLME-SAP frame) is input from PLME-SAP frame analysis unit 11027 to buffer 110230 (S201). When data is input from PLME-SAP frame analysis unit 11027 to buffer 110230 (YES in S201), frame type selection unit 110231 analyzes the data (S203). Here, it is determined whether the data includes beacon information or other data.

When the result of the analysis in step S203 indicates that the data is data including beacon information (YES in S205), the beacon information is extracted from the data and a beacon information packet is generated and stored, together with an identifier indicating that the priority is high, in priority addition buffer 110235 (S207).

In contrast, when the result of the analysis in step S203 indicates that the data does not the one including beacon information (NO in S205), parameters are set according to the data and MAC processing unit 110232 performs MAC processing. Depending on the data, namely if the data is to be transferred to PNC-LINK layer 11001, a transmission packet is generated based on the data and stored, together with an identifier indicating that the priority is not so high as the priority of the beacon information packet, in priority addition buffer 110235 (S209).

When it is determined in step S201 that data has not been input to buffer 110230 (NO in S201), steps S203, S205 described above are skipped and the MAC processing in step S209 is performed.

For priority addition buffer 110235, it is determined all the time whether the buffer is empty or not (S211). If the buffer is not empty (NO in S211), packets are output in the order changed depending on the priority added to the packets. Thus, packets are successively output to MLME-SAP frame generation unit 11028 in the order of priority starting from a highest-priority packet (S213). Then, the process returns to step S201, namely the determination as to whether data has been input to buffer 110230.

MLME-SAP frame generation unit 11028 generates a MLME-SAP frame from the packet and provides the frame through the MLME-SAP from PNC-MAC layer 11002 to PNC-LINK layer 11001. However, MLME-SAP frames provided through the MLME-SAP from PNC-MAC layer 11002 to PNC-LINK layer 11001 include not only the data of the beacon detection signal but also data irrelevant to the beacon detection signal. In particular, when MPEG2-TS data is transmitted/received in real time, the amount of data is large and thus there are many MLME-SAP frames irrelevant to the beacon detection signal. Therefore, queuing occurs in the process of transferring packets from PNC-MAC controller 11023 to MLME-SAP frame generation unit 11028, the process of generating the MLME-SAP frame by MLME-SAP frame generation unit 11028, or the process of writing/reading into/from MLME-SAP frame transmission/reception buffers 11017, 11014.

As discussed above, however, the identifier indicating high priority is added to beacon information packets so that the beacon information packets as well as MLME-SAP frames generated from the beacon information packet do not queue and are given priority over other packets and MLME-SAP frames to be transmitted.

Figure 12:
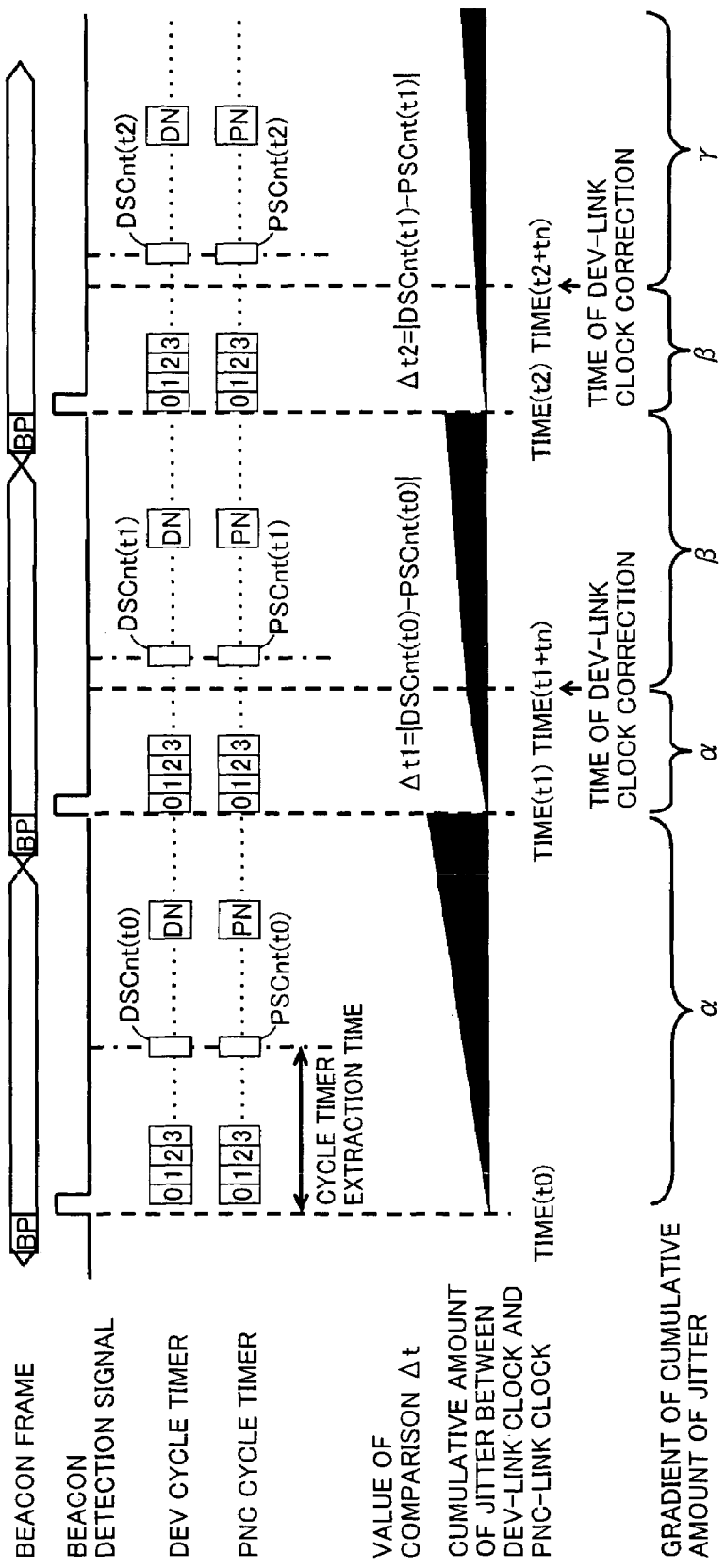
FIG. 12 illustrates a correction of the DEV cycle timer.

Beacon detection signal A or beacon detection signal B described above is used to correct the DEV cycle timer. Therefore, as shown in FIG. 12, synchronization is established between the PNC cycle timer and the DEV cycle timer. While the above description relates to transmission of beacon detection signal A or beacon detection signal B of the PNC, the same is applied to the DEV.

Referring to FIG. 12, when a beacon is detected in PNC-MAC layer 11002 and DEV-MAC layer 13002 each and beacon detection signal. A or beacon detection signal B is transmitted at time (t0) to PNC-LINK layer 11001 and DEV-LINK layer 13001 each, the beacon detection signal is input to PMC cycle timer generation unit 11008 and DEV cycle timer generation unit 13051 each. Reference timer generation unit 11008 and reference timer generation unit 130510 are reset and counting is started. Then, respective counts at the time when a predetermined cycle timer extraction time has passed are output as PNC cycle timer PSCnt(t0) and DEV cycle timer DSCnt(t0). DEV cycle timer DSCnt(t0) is temporarily stored in DEV cycle timer temporary storage unit 130513 and PNC cycle timer PSCnt(t0) is added to the succeeding beacon frame to be provided from the PNC to the DEV.

Then, in PNC-MAC layer 11002 and DEV-MAC layer 13002 each, a beacon is detected. When beacon detection signal A or beacon detection signal B is transmitted at time (t1) to PNC-LINK layer 11001 and DEV-LINK layer 13001 each, the beacon detection signal is similarly input to PNC cycle timer generation unit 11008 and DEV cycle timer generation unit 13051 each. Similarly, reference timer generation unit 11008 and reference timer generation unit 130510 are reset and counting is started. Similarly as well, respective counts at the time when a predetermined cycle timer extraction time has passed are output as PNC cycle timer PSCnt(t1) and DEV cycle timer DSCnt(t1).

In this case, the DEV obtains PNC cycle timer PSCnt(t0) added to the beacon frame. In the DEV, at time (t1+tn) that is a predetermined timing, the obtained PNC cycle timer PSCnt (t0) is used to correct the DEV-LINK clock. Specifically, cycle timer comparison unit 130514 compares the obtained PNC cycle timer PSCnt(t0) with DEV cycle timer DSCnt(t0) temporarily stored in DEV cycle timer temporary storage unit 130513 to obtain a value of comparison $\Delta t1$ and $\Delta t1$ is fed back to PLL 130510 to correct the DEV cycle timer by comparison value $\Delta t1$ so that the DEV cycle timer matches the PNC cycle timer.

According to this correction, a cumulative amount of jitter that is accumulation of differences between the PNC cycle timer and the DEV cycle timer changes in the manner described below. Specifically, until time (t1) when the beacon detection signal is input, jitter is accumulated with gradient $\alpha$ according to the difference between the PNC cycle timer and the DEV cycle timer before correction. At time (t1), the counter is reset so that the difference between the PNC cycle timer and the DEV cycle timer becomes zero and the difference is temporarily cancelled. However, accumulation of jitter is started again with a predetermined gradient α according to the difference between the PNC cycle timer and the DEV cycle timer before correction. At time (t1+tn), the DEV cycle timer is corrected by comparison value Δt1 as described above to reduce the difference between the PNC cycle timer and the DEV cycle timer and the rate of accumulation of jitter becomes a predetermined gradient β that is smaller than α.

The above-described correction is repeated to gradually reduce the difference between the PNC cycle timer and the DEV cycle timer and thereby establish synchronization between the PNC cycle timer and the DEV cycle timer. In the specific example discussed above, a comparison is made between PNC cycle timer PSCnt(t) according to the immediately preceding beacon detection signal obtained as the one added to the beacon and DEV cycle timer DSCnt(t) according to the immediately preceding beacon detection signal to correct the DEV cycle timer. Alternatively, in the case where PNC cycle timers PSCnt(t) previously obtained are accumulated in the DEV, the average for example of a plurality of previous PNC cycle timers PSCnt(t) accumulated may be compared with DEV cycle timer DSCnt(t) to correct the DEV cycle timer.

Figure 13:
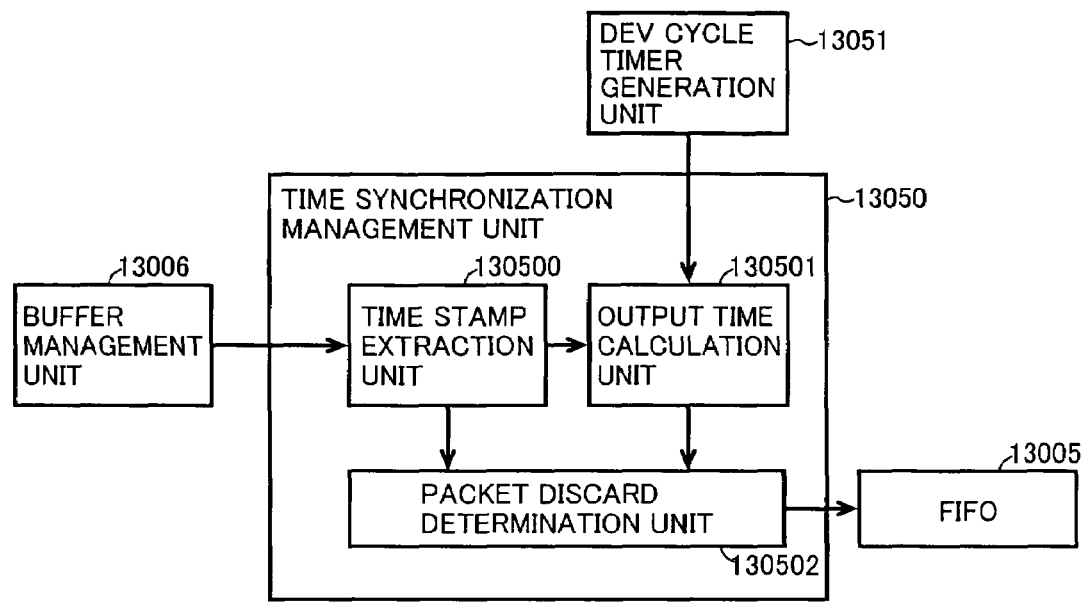
FIG. 13 shows a specific example of a configuration of a time synchronization management unit 13050.

Then, in connection with FIG. 13, a configuration of time synchronization management unit 13050 of DEV-LINK 13001 is described.

Referring to FIG. 13, time synchronization management unit 13050 is configured to include a time stamp extraction unit 130500, an output time calculation unit 130501 and a packet discard determination unit 130502.

Time stamp extraction unit 130500 receives MPEG2-TS data from buffer management unit 13006 and extracts a time stamp added to the data. Time stamp extraction unit 130500 then provides the MPEG2-TS data to packet discard determination unit 130502 and provides the extracted time stamp to output time calculation unit 130501.

Output time calculation unit 130501 obtains the corrected DEV cycle timer from DEV cycle timer generation unit 13051 and calculates time interval (timer value) at which the MPEG2-TS data is input in packet form. A comparison is then made between the result of the calculation and the time stamp extracted from the MPEG2-TS data and provided from time stamp extraction unit 130500 and, according to the result of the comparison, a packet output permission signal or packet discard instruction signal is output to packet discard determination unit 130502.

According to the packet output permission signal or packet discard instruction signal from output time calculation unit 130501, packet discard determination unit 130502 outputs to FIFO 13005 the MPEG2-TS data provided from time stamp extraction unit 130500 in packet form or discards the data.

Figure 14:
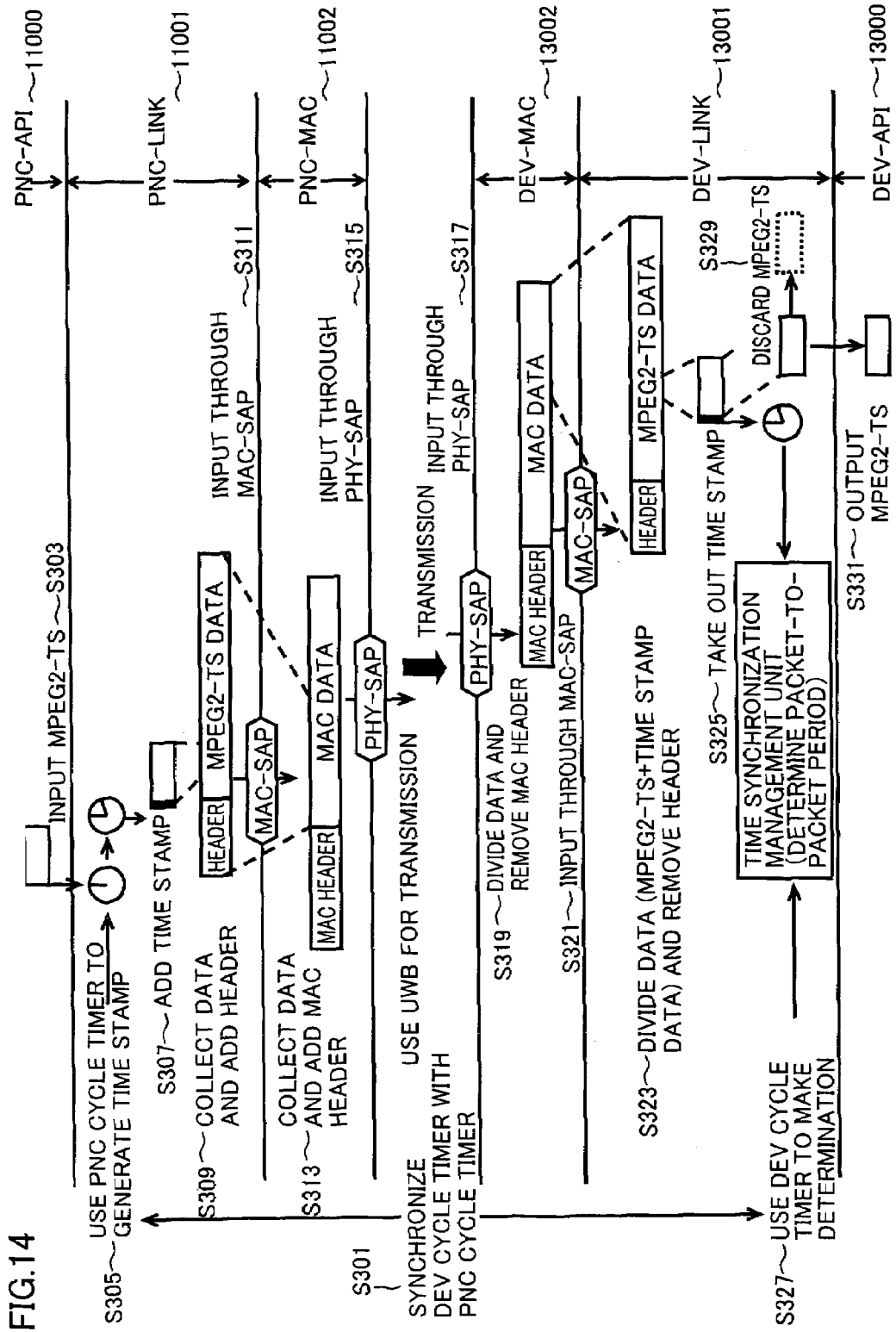
FIG. 14 is a flowchart illustrating an adjustment process for an output timing of MPEG2-TS data in the time synchronization management unit 13050.

A description is further given in connection with FIG. 14 of an adjustment process for the output timing of the MPEG2-TS data in time synchronization management unit 13050. FIG. 14 shows a flow of the MPEG2-TS data that is input from PNC-API layer 11000 to PNC-LINK layer 11001 and output from DEV-LINK layer 13001 to DEV-API layer 13000.

Referring to FIG. 14, the MPEG2-TS data that is generated by being encoded by MPEG2 encoding apparatus 11004 of PNC-API layer 11000 is first input from PNC-API layer 11000 through FIFO 1005 to PNC-LINK layer 11001 (S303). At this time, the timing at which the data is read from FIFO 1005 to PNC-LINK layer 11001 in buffer management unit 11006 of PNC-LINK layer 11001 is added as a time stamp to the top of the MPEG2-TS data (S305). The time stamp added at this time is based on the PNC cycle timer that is generated by PNC cycle timer generation unit 11008 with the above-described correction made thereto (S301).

In PNC-LINK layer 11001, a plurality of MPEG2-TS data with time stamps added thereto are collected to which a header is added and accordingly a single piece of MPEG2-TS data is structured (S309). Then, the data is input as a MAC-SAP frame from PNC-LINK layer 11001 to PNC-MAC layer 11002 through the MAC-SAP (S311).

In PNC-MAC layer 11002, a plurality of MPEG2-TS data input thereto are collected to which a MAC header is added and accordingly a single piece of MAC data is structured (S313). Then, the data is input as a PHY-SAP frame from PNC-MAC layer 11002 to PNC-PHY layer 11003 through the PHY-SAP (S315). Further, the data is transmitted from PNC-PHY layer 11003 to the DEV using the UWB wireless technology. The transmitted MAC data is received in DEV-PHY layer 13003 and input from DEV-PHY layer 13003 to DEV-MAC layer 13002 through the PHY-SAP (S317).

In DEV-MAC layer 13002, the MAC header is removed from the MAC data that is input through the PHY-SAP to DEV-PHY layer 13003 and the resultant data is divided into a plurality of MPEG2-TS data (S319). These MPEG2-TS data obtained through the division are input as MAC-SAP frames through the MAC-SAP to DEV-LINK layer 13001 (S321).

In DEV-LINK layer 13001, from these MPEG2-TS data input thereto, the header is removed and the data is further divided into a plurality of MPEG2-TS data with the time stamp added thereto (S323). Further, in time stamp extraction unit 130500 of time synchronization management unit 13050, the added time is taken from the MPEG2-TS data (S325).

In output time calculation unit 13050 of time synchronization management unit 13050, the value of the time stamp taken from the MPEG2-TS data is compared with the time value generated from DEV cycle timer generation unit 13051 (S327). If these values are equal to each other, the MPEG2-TS data is output in packet form to FIFO 13005 at the timing based on the DEV cycle timer (S331). If these values are not equal to each other, the MPEG2-TS data is discarded without being output to FIFO 13005 (S329).

A method of calculation for making the determination as to whether the packet is discarded or not in output time calculation unit 13050 described above is specifically discussed below.

It is supposed here that MPEG2-TS data with time stamps added thereto are transmitted in ideal manner in the form of packet 1, packet 2, packet 3 . . . from the PNC to the DEV. Then, the packets of the MPEG2-TS data are received by DEV-LIN layer 13001 at intervals maintained at packet intervals (period T1, period T2, period T3 . . . ) at which the data are input from PNC-API layer 11000 to PNC-LINK layer 11001. The timing of the input from PNC-API layer 11000 to PNC-LINK layer 11001 is added as a time stamp based on the PNC cycle timer to each MPEG2-TS data.

Specifically, supposing that:

Period $T1$=time stamp of packet 2−time stamp of packet 1

. . .

Period $N$=time stamp of packet $(N+1)$−time stamp of packet $N$, period N corresponding to the interval at which the MPEG2-TS data are output in packet form from FIFO 1005 to PNC-LINK layer 11001 of the PNC, which is the transmitter, is calculated based on the values of the time stamps added to the packet preceding the period and the packet following the period.

In the DEV which is the receiver, output time calculation unit 13050 of time synchronization management unit 13050 calculates a packet interval (RxT(N+1)−RxT(N)) from timing (RxT(N)) at which packet N is input as a packet from buffer management unit 13006 and timing (RxT(N+1)) at which packet (N+1) is input. Then, it is determined whether the packet interval and period N are equal to each other.

In other words, when the following relation:

$$RxT(N+1)-RxT(N)=\text{time stamp of packet }(N+1)-\text{time stamp of packet }N$$

is satisfied, it is determined that the MPEG2-TS data are output in packet form at the timing at which the MPEG2-TS data are input to FIFO 13005 and a packet output permission signal is output to packet discard determination unit 130502.

In contrast, when the above-described relation is not satisfied, it is determined that the MPEG2-TS data are to be discarded, and a packet discard instruction signal is output to packet discard determination unit 130502.

Actually, since the above-described calculation is performed in time synchronization management unit 13050, a certain delay time d is taken into consideration as the time for the calculation, and accordingly it is determined whether or not the relation:

$$RxT(N+1)-RxT(N)=\text{time stamp of packet }(N+1)-\text{time stamp of packet }N+d$$

is satisfied.

As discussed above, in the PNC which is a transmission apparatus and the DEV which is a reception apparatus in the present embodiment, the beacon frame is used to establish synchronization between the PNC cycle timer and the DEV cycle. In other words, synchronization between the PNC-LINK clock and the DEV-LINK clock is established.

Therefore, the MPEG2-TS data transmitted at the timing based on the PNC-LINK clock from the PNC is input to the DEV-LINK layer at the timing based on the DEV-LINK clock that is synchronized with the PNC-LINK clock. From the DEV-LINK layer to the MPEG2-TS decoding apparatus of the DEV-API layer, the MPEG2-TS data is provided at the timing based on the DEV-LINK clock. Thus, clocks on which the layers are based are synchronized with each other to suppress jitter between layers in transmission/reception of the MPEG2-TS and accordingly the PNC and DEV of the present embodiment effectively serve as a jitter correction apparatus.

It is described above in connection with the present embodiment that the MPEG2-TS system is implemented in the API layer and data is transmitted/received in accordance with MPEG2-TS. However, the configurations of the PNC and DEV of the present embodiment are not limited to the MPEG2-TS. Namely, the configurations are effective in the case where data is transmitted in real time. Namely, the present embodiment includes a system that transmits/receives packet data with time information added thereto like the packet data including PCR of the MPEG2-TS. Specifically, an example of the system is a system of transmitting/receiving packet data using RTP (Real-time Transport Protocol) or RTCP (Real-time Transport Control Protocol) used for the Internet. The system for transmission of audio and video stream over the Internet is defined by such protocols as RTP and RTCP. RTP is a protocol defining a packet form when audio data or video data is transmitted with time information added thereto so that media synchronization is established on the receiver. RTCP is a protocol defining a method of synchronization using a procedure of transmitting reference time information for media synchronization with respect to audio and video streams or the time information.

Further, as described in connection with FIG. 14, the timing of input of the MPEG2-TS data to the PNC-LINK layer is added, as a time stamp based on the PNC cycle timer, to the MPEG2-TS data. According to the input intervals of packets to the PNC-LINK layer that are calculated based on the time stamp and input intervals of packets to the DEV-LINK layer that are calculated based on the DEV cycle timer in the DEV-LINK layer, it is determined whether the data is to be output to the MPEG2-TS decoding apparatus of the DEV-API layer. Therefore, it can be prevented that any MPEG2-TS data received at a timing that does not match the timing of transmission is output to the MPEG2-TS decoding apparatus, like MPEG2-TS data that is input, when synchronization between the DEV cycle timer and the PNC cycle timer has not been established, to the DEV-LINK layer that is based on the DEV-LINK clock. In other words, it is prevented to output to the MPEG2-TS decoding apparatus MPEG2-TS data that could be imperfect in terms of data transmission/reception between layers due to mismatching of clocks.

Further, as described above in connection FIG. 20, in the MPEG2-TS decoding apparatus, based on the STC (System Time Clock) of the MPEG2 encoding apparatus, the time stamp that is time information embedded in the MPEG2-TS packet according to the time of transmission of the MPEG2-TS data from the MPEG2 encoding apparatus is used to establish synchronization with the clock of the MPEG2 encoding apparatus. As discussed above, since the MPEG2-TS data that is perfect in terms of transmission/reception between respective layers is input to the MPEG2-TS decoding apparatus, the clock of the MPEG2-TS decoding apparatus and the clock of the MPEG2 encoding apparatus are appropriately synchronized with each other and the operation of the MPEG2 system itself is ensured.

It is described above in connection with the present embodiment that the beacon frame transmitted from the PNC to the DEV is not lost and the beacon frame is detected by the DEV. Here, in connection with FIG. 15, a structure of DEV-LINK layer 13001 that can address the case where the beacon frame is lost is described.

Figure 15:
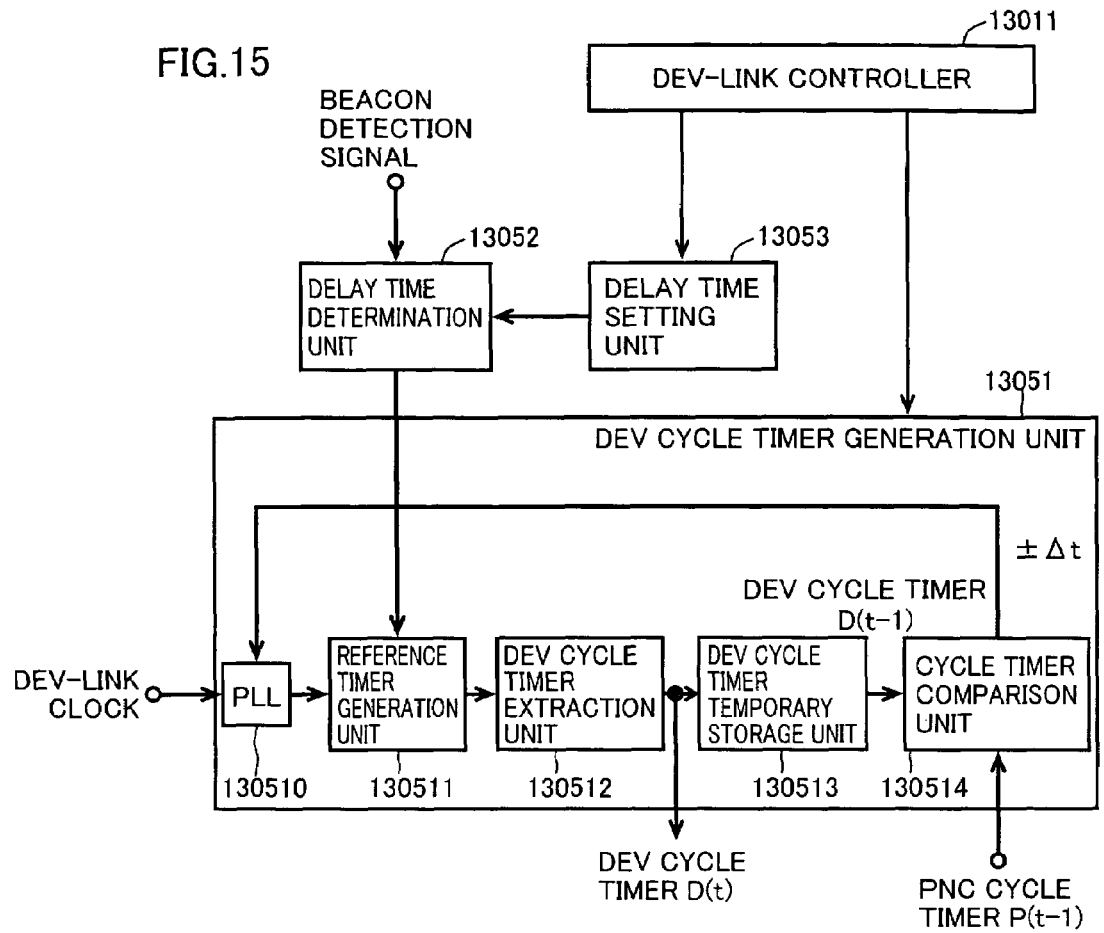
FIG. 15 shows a specific example of the DEV-LINK layer 13001 that can address the case where a beacon frame is lost.

Referring to FIG. 15, DEV-LINK layer 13001 in this case is configured to include the configuration shown in FIG. 3 and additionally include a delay time determination unit 13052 and a delay time setting unit 13053. Here, the configuration of DEV cycle timer generation unit 13051 is similar to that of DEV cycle timer generation unit 13051 described in connection with FIG. 6.

In this case, DEV-LINK controller 13011 derives information about the cycle period of the beacon frame as well as beacon accuracy from a MLME-SAP frame that is a beacon frame based on the result of analysis provided from MLME-SAP frame analysis and selection unit 13015 and provides the information to delay time setting unit 13053. The beacon accuracy refers to an amount defining a beacon error. The beacon is transmitted at constant intervals based on the beacon cycle period. However, depending of the accuracy of the clock of the PHY layer of the PNC that generates the beacon, the beacon period corresponding to the constant interval could deviate from the original one. The beacon accuracy is a value indicating "possibility of deviation." Namely, as the beacon accuracy is smaller, the beacon period is close to the constant interval.

Delay time setting unit 13053 sets a delay time of the beacon frame based on information about the cycle period of the beacon frame and the information about the beacon accuracy provided from DEV-LINK controller 13011.

Delay time determination unit 13052 monitors input of a beacon detection signal from the DEV-MAC controller (beacon detection signal B) or a beacon detection signal from DEV-LINK controller 13011 (beacon detection signal A), and outputs, if the beacon detection signal is input within the delay time set by delay time setting unit 13053, the beacon detection signal to DEV cycle timer generation unit 13051. In contrast, when the beacon detection signal is not input within the delay time set by delay time setting unit 13053, a virtual beacon detection signal that is generated virtually is immediately output to DEV cycle timer generation unit 13051.

Figure 16:
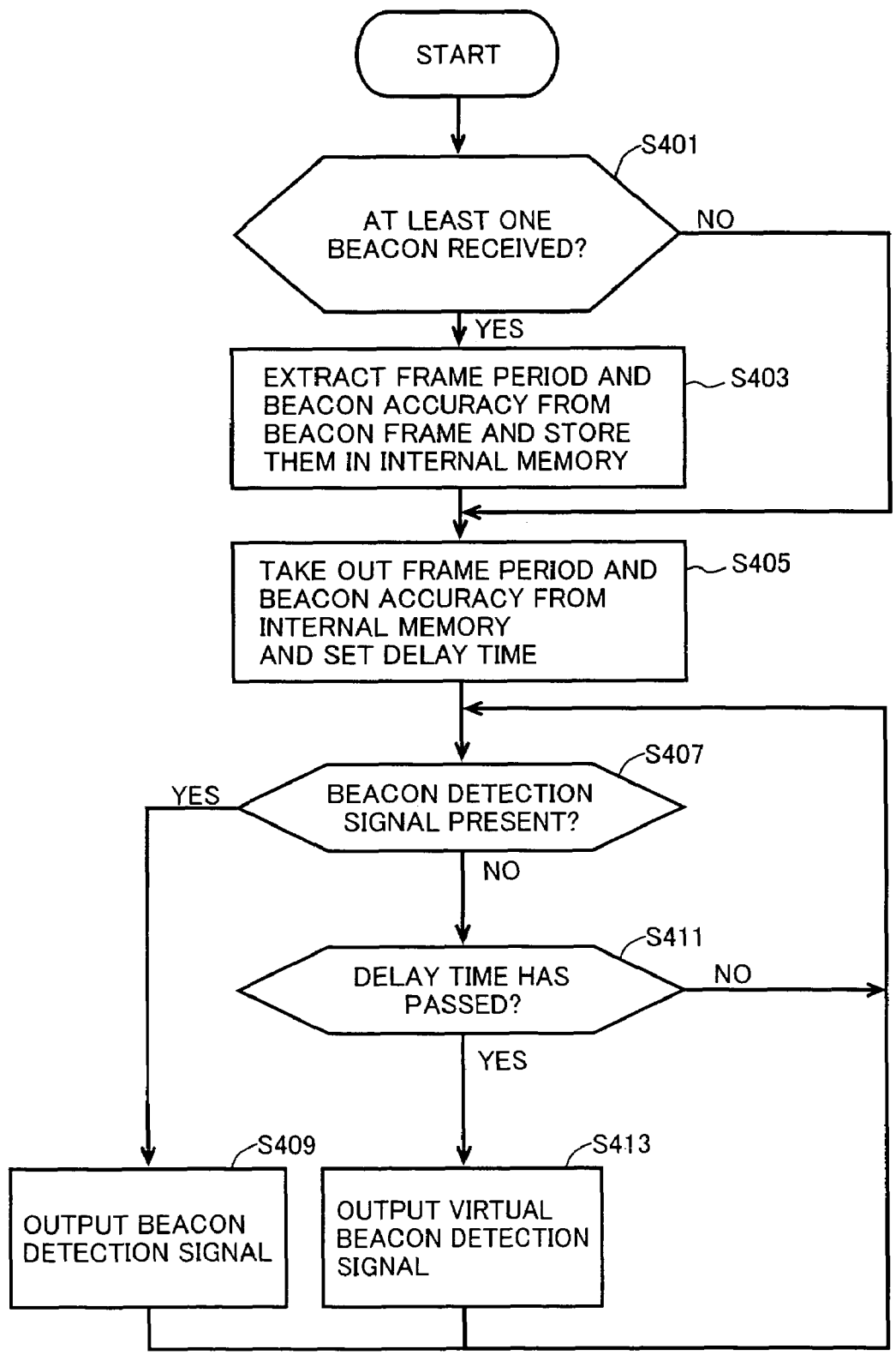
FIG. 16 is a flowchart illustrating a process in the DEV-LINK layer 13001 that can address the case where a beacon frame is lost.
Figure 17:
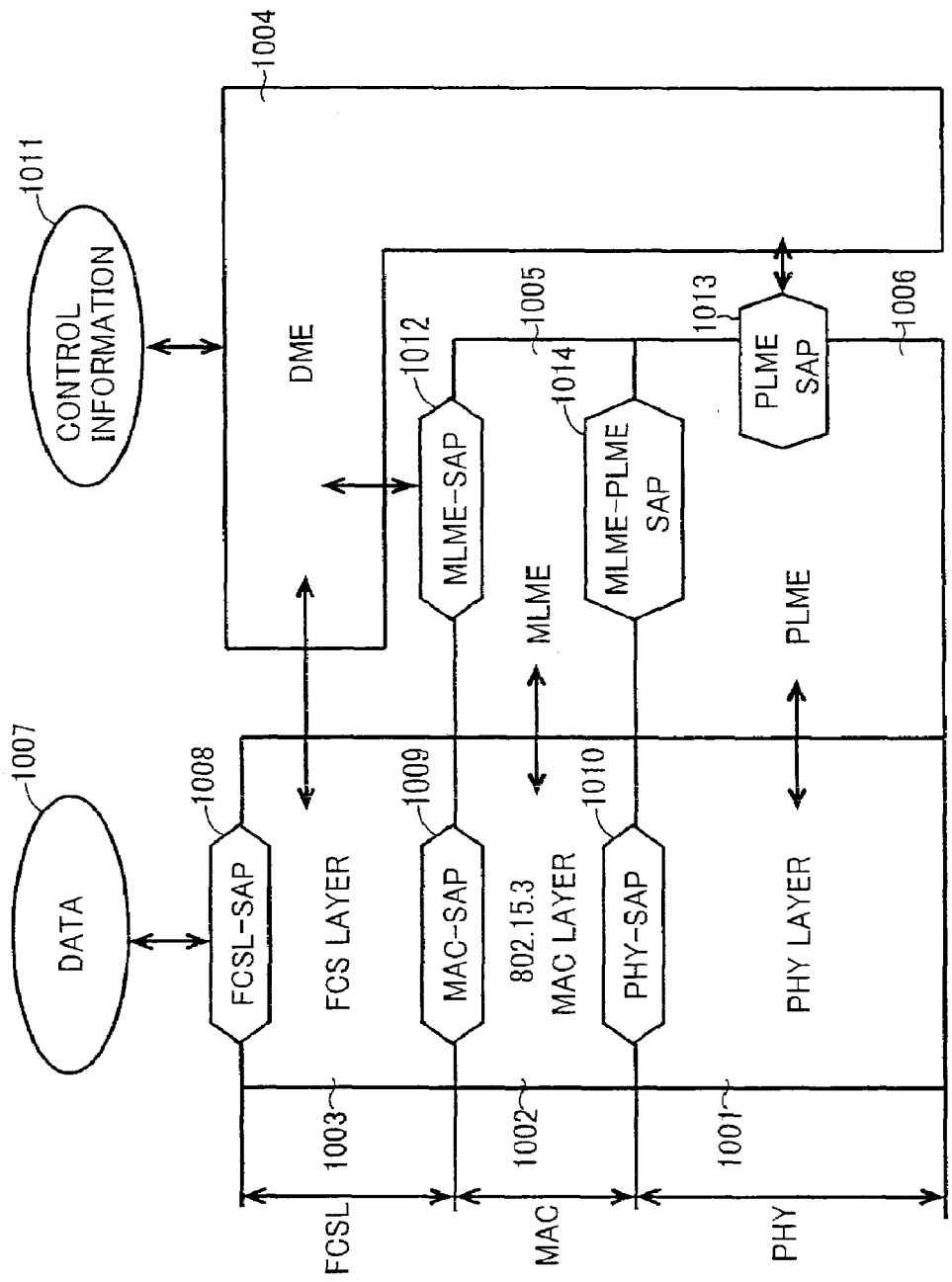
FIG. 17 shows a reference model of a network protocol stack defined by IEEE 802.15.3.

Moreover, in connection with FIG. 16, a process in DEV-LINK layer 13001 is described that can address the case where the beacon frame is lost.

Referring to FIG. 16, a beacon frame is first input as a MLME-SAP frame from DEV-MAC layer 13002 to DEV-LINK layer 13001 (YES in S401). Then, DEV-LINK controller 13011 extracts, from the MLME-SAP frame, information about the cycle period of the beacon frame and the information about beacon accuracy and provides the information to delay time setting unit 13053, and the information is stored in an internal memory of delay time setting unit 13053 (S403).

Then, delay time setting unit 13053 takes out information about the beacon frame cycle period and the beacon accuracy from the internal memory and sets a delay time (S405). In step S405, the information about the beacon frame cycle period, a processing time based on the information about the beacon accuracy, and a clock error obtained from the DEV-LINK clock are used to calculate the delay time by the expression:

Delay time=period (Tsec)+processing time+clock error and the delay time is accordingly set.

Then, delay time determination unit 13052 monitors input of a beacon detection signal (S407). In other words, when the beacon detection signal is input to delay time determination unit 13052, the beacon detection signal is output as it is to DEV cycle timer generation unit 13051 (S409).

In contrast, when the beacon detection signal is not input and the delay time set in step S408 has passed (NO in S407 and YES in S411), delay time setting unit 13052 generates a virtual beacon detection signal and the virtual beacon detection signal is immediately output to DEV cycle time generation unit 13051 (S413). When the delay time has not passed (NO in S411), the monitoring of the input of the beacon detection signal in step S407 described above is continued.

As the above-described processing is carried out in DEV-LINK layer 13001, the virtual beacon detection signal can immediately be generated, even in the case where the detection signal indicating input of the beacon frame transmitted from the PNC is partially lost, based on previous information (frame period, beacon accuracy for example) that is stored in the internal memory when the beacon frame can be detected. Therefore, even in such a case, the virtual beacon detection can be used to ensure, to the degree as large as possible, the synchronization between the PNC cycle timer and the DEV cycle timer.

According to the present embodiment, it is described that the clock synchronization of the LINK layers is ensured using the beacon frame that is a synchronization ensuring signal used in the conventional art for ensuring synchronization between physical layers and allowing communication to be made. Naturally, the synchronization ensuring signal to be used is not limited to the beacon frame and any signal with similar function may be used.

The present embodiment disclosed here is by way of illustration and example in every respect and is not to be taken by way of limitation. It is intended that the scope of the present invention is defined not by the foregoing description but by claims and includes all modifications within the meaning and scope equivalent to the claims.

INDUSTRIAL APPLICABILITY

As heretofore described, with the jitter correction apparatus of the present invention, the clock between layers of the transmission apparatus and the reception apparatus can be corrected to reduce jitter in data transmission/reception and ensure synchronization between the transmission apparatus and the reception apparatus, and thus the apparatus can advantageously be used for a communication apparatus.

The invention claimed is:

1. A jitter correction apparatus comprising:
    an output unit generating, in a MAC (Medium Access Control) layer, when data except for a beacon is received in a physical layer, transmission data based on said data received and outputting said transmission data through an interface between said MAC layer and a LINK layer to said LINK layer;
    a beacon detection signal output unit outputting, when data that is a beacon is received in said physical layer, a beacon detection signal from said MAC layer to said LINK layer; and
    a correction unit using said beacon detection signal to correct, in said LINK layer, a clock frequency generation function of said LINK layer, wherein
    said beacon detection signal output unit outputs, from said MAC layer to said LINK layer, said beacon detection signal with higher priority given thereto over said transmission data, without queuing said beacon detection signal together with said transmission data in said interface.

2. A jitter correction apparatus comprising:
    an output unit generating, in a MAC (Medium Access Control) layer, when data except for a beacon is received in a physical layer, transmission data based on said data received and outputting said transmission data through an interface between said MAC layer and a LINK layer to said LINK layer;
    a beacon detection signal output unit outputting, when data that is a beacon is received in said physical layer, a beacon detection signal from said MAC layer to said LINK layer; and
    a correction unit using said beacon detection signal to correct, in said LINK layer, a clock frequency generation function of said LINK layer
    a timer value generation unit using said clock frequency generation function to generate, in said LINK layer, a timer value based on the time of input of said beacon detection signal to said LINK layer; and
    a beacon transmission unit adding a timer value (N) that is said timer value generated when a N-th beacon is received in said physical layer, to a (N+1)-th beacon to transmit said (N+1)-th beacon to another apparatus, wherein
    said beacon detection signal output unit outputs, from said MAC layer to said LINK layer, said beacon detection signal with higher priority given thereto over said transmission data, without queuing said beacon detection signal together with said transmission data in said interface, and
    said correction unit uses, when said (N+1)-th beacon is received in said physical layer, a difference between said timer value (N) added to said (N+1)-th beacon and a timer value (N+1) that is generated by said timer value generation unit when said (N+1)-th beacon is received in said physical layer to make a correction to said timer value generation unit.

3. The jitter correction apparatus according to claim 2, wherein
said MAC layer and said LINK layer are connected by a transmission line without said interface therebetween,
said beacon detection signal output unit outputs said beacon detection signal through said transmission line from said MAC layer to said LINK layer without through said interface.

4. The jitter correction apparatus according to claim 2, wherein
said beacon detection signal output unit adds to said beacon detection signal an identifier indicting priority, and
said beacon detection signal is given higher priority over said transmission data based on said identifier in said interface and is output from said MAC layer to said LINK layer.

5. The jitter correction apparatus according to claim 2, further comprising:
a time stamp generation unit generating, in said LINK layer, for data that is input from an application layer to said LINK layer, time information based on the time of the input by using the timer value generated by said timer value generation unit;
a data transmission unit adding said time information generated by said time stamp generation unit to said data that is input from said application layer to transmit said data to another apparatus; and
a determination unit determining, when N-th data (N) to which the time information is added and (N+1)-th data to which the time information is added are input to said LINK layer, whether or not said data (N+1) is to be output from said LINK layer to the application layer, based on a difference between the time information added to said data (N) and the time information added to said data (N+1) as well as a difference between a timer value based on the time of input of said data (N) to said LINK layer and a timer value based on the time of input of said data (N+1) to said LINK layer that are obtained using timer values generated by said timer value generation means.

6. A jitter correction apparatus comprising:
an output unit generating, in a MAC (Medium Access Control) layer, when data except for a beacon is received in a physical layer, transmission data based on said data received and outputting said transmission data through a transmission line between said MAC layer and a LINK layer to said LINK layer;
a beacon detection signal output unit outputting, when data that is a beacon is received in said physical layer, a beacon detection signal from said MAC layer to said LINK layer; and
a correction unit using said beacon detection signal to correct, in said LINK layer, a clock frequency generation function of said LINK layer, wherein
said beacon detection signal output unit outputs said beacon detection signal through said transmission line from said MAC layer to said LINK layer without queuing said beacon detection signal together with said transmission data in said interface with higher priority being given to the beacon detection signal than to the transmission data.

7. A jitter correction apparatus comprising:
an output unit generating, in a MAC (Medium Access Control) layer, when data except for a beacon is received in a physical layer, transmission data based on said data received and outputting said transmission data through an interface between said MAC layer and a LINK layer to said LINK layer;
a beacon detection signal output unit outputting, when data that is a beacon is received in said physical layer, a beacon detection signal from said MAC layer to said LINK layer; and
a correction unit using said beacon detection signal to correct, in said LINK layer, a clock frequency generation function of said LINK layer, wherein
said beacon detection signal output unit outputs, from said MAC layer to said LINK layer, said beacon detection signal with higher priority given thereto over said transmission data, without queuing said beacon detection signal together with said transmission data in said interface, wherein
said beacon detection signal output unit adds to said beacon detection signal an identifier indicting priority, and
said beacon detection signal is given higher priority over said transmission data based on said identifier in said interface and is output from said MAC layer to said LINK layer.

8. A jitter correction apparatus comprising:
a reception unit receiving data in synchronization with another apparatus based on a beacon;
a definition unit defining transmission and reception of data in said reception unit; and
an access control unit outputting said data according to said definition unit, wherein
said access control unit includes:
an output unit outputting, when data except for a beacon is received by said reception unit, transmission data based on said data through an interface between said definition unit and said access control unit to said access control unit;
a beacon detection signal output unit outputting to said access control unit, when data that is a beacon is received by said reception unit, a beacon detection signal with higher priority given thereto over said transmission data, without queuing said beacon detection signal together with said transmission data in said interface; and
a correction unit using said beacon detection signal to make a correction to a clock frequency generation function included in said access control unit.

9. A jitter correction apparatus comprising:
an output unit generating, in a MAC (Medium Access Control) layer, when data except for a signal used for ensuring synchronization of a physical layer is received in said physical layer, transmission data based on said data received and outputting said transmission data through an interface between said MAC layer and a LINK layer to said LINK layer;
a detection signal output unit outputting from said MAC layer to said LINK layer, when said signal is received in said physical layer, a detection signal indicating that said signal is detected; and
a correction unit using said detection signal to make a correction, in said LINK layer, to a clock frequency generation function of said LINK layer, wherein
said detection signal output unit outputs, from said MAC layer to said LINK layer, said detection signal with higher priority given thereto over said transmission data, without queuing said detection signal together with said transmission data in said interface.

* * * * *

UNITED STATES PATENT AND TRADEMARK OFFICE
CERTIFICATE OF CORRECTION

PATENT NO.        : 7,664,145 B2                                    Page 1 of 1
APPLICATION NO.   : 10/565906
DATED             : February 16, 2010
INVENTOR(S)       : Akamatsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1059 days.

Signed and Sealed this

Thirtieth Day of November, 2010

David J. Kappos
*Director of the United States Patent and Trademark Office*